United States Patent
Srinivasan et al.

(10) Patent No.: US 8,346,730 B2
(45) Date of Patent: Jan. 1, 2013

(54) DEDUPLICATION OF DATA ON DISK DEVICES BASED ON A THRESHOLD NUMBER OF SEQUENTIAL BLOCKS

(75) Inventors: Kiran Srinivasan, Cupertino, CA (US);
Garth Goodson, Fremont, CA (US);
Kaladhar Voruganti, San Jose, CA (US)

(73) Assignee: NetApp. Inc., Sunnyvale, CA (US)

( * ) Notice: Subject to any disclaimer, the term of this patent is extended or adjusted under 35 U.S.C. 154(b) by 766 days.

(21) Appl. No.: 12/110,122

(22) Filed: Apr. 25, 2008

(65) Prior Publication Data
US 2009/0271402 A1    Oct. 29, 2009

(51) Int. Cl.
*G06F 7/00* (2006.01)
*G06F 17/00* (2006.01)
(52) U.S. Cl. ........................ 707/664; 707/692
(58) Field of Classification Search .................. 707/664, 707/692
See application file for complete search history.

(56) References Cited

U.S. PATENT DOCUMENTS

| | | | |
|---|---|---|---|
| 7,092,956 B2 | 8/2006 | Ruediger | |
| 7,539,710 B1 | 5/2009 | Haustein et al. | |
| 7,908,436 B1 | 3/2011 | Srinivasan et al. | |
| 2005/0154848 A1 | 7/2005 | Itoh | |
| 2008/0243769 A1* | 10/2008 | Arbour et al. ................... | 707/2 |
| 2009/0089483 A1* | 4/2009 | Tanaka et al. ................... | 711/103 |
| 2009/0132619 A1* | 5/2009 | Arakawa et al. ............... | 707/205 |
| 2009/0204649 A1 | 8/2009 | Wong | |

OTHER PUBLICATIONS

Eran Gal and Sivan Toledo, Algorithms and Data Structures for Flash Memories, ACM Computing Surveys (CSUR) Archive, Jun. 2005, pp. 138-163, vol. 37, Issue 2, Publisher ACM, New York City, NY, USA.
U.S. Appl. No. 12/110,193, filed Apr. 25, 2008, Srinivasan, et al.
U.S. Appl. No. 13/419,881, filed Mar. 14, 2012, Nayak.
U.S. Appl. No. 13/419,948, filed Mar. 14, 2012, Nayak.
U.S. Appl. No. 13/022,337, filed Feb. 7, 2011, Srinivasan.

* cited by examiner

*Primary Examiner* — Apu Mofiz
*Assistant Examiner* — Jared Bibbee
(74) *Attorney, Agent, or Firm* — Stattler-Suh PC

(57) ABSTRACT

Deduplication of data on disk devices based on a threshold number (THN) of sequential blocks is described herein, the threshold number being two or greater. Deduplication may be performed when a series of THN or more received blocks (THN series) match a sequence of THN or more stored blocks (THN sequence), whereby a sequence comprises blocks stored on the same track of a disk device. Deduplication may be performed using a block-comparison mechanism comprising metadata entries of stored blocks and a mapping mechanism containing mappings of deduplicated blocks to their matching blocks. The mapping mechanism may be used to perform later read requests received for the deduplicated blocks. The deduplication described herein may reduce the read latency as the number of seeks between tracks may be reduced. Also, when a seek to a different track is performed, the seek time cost is spread over THN or more blocks.

30 Claims, 15 Drawing Sheets

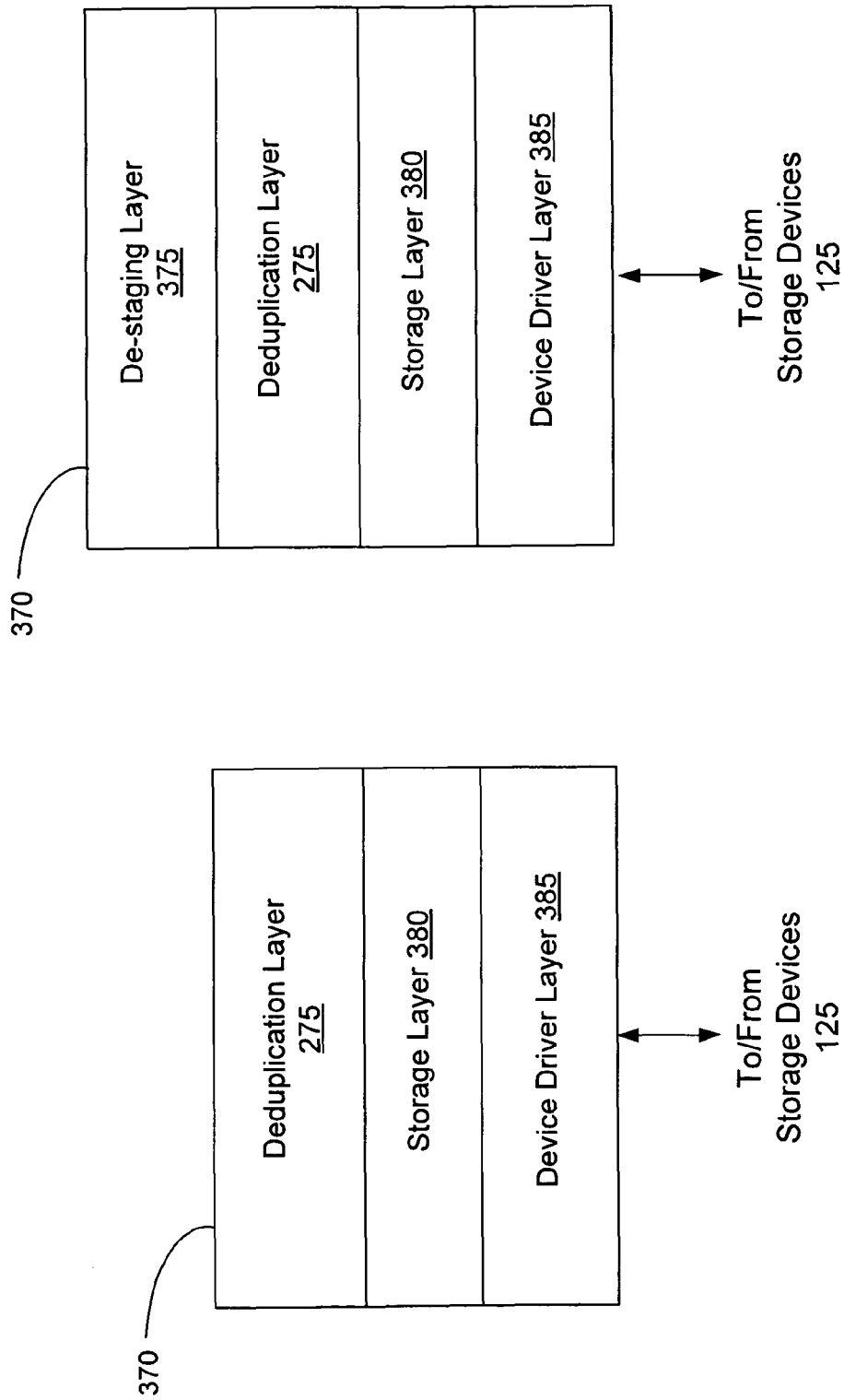

| Content ID | Flag | Size | Location | Offset | Ref Count |
|---|---|---|---|---|---|
| 5 | F | 10 | LBN N | 0 | 3 |
| CY | P | 5 | | 0 | |
| CZ | P | 5 | | 1 | |
| ... | P | 5 | | 2 | |
| | P | 5 | | 5 | |
| | P | 6 | | 0 | |
| | P | 6 | | 1 | |
| ... | F | 12 | LBN M | 0 | 2 |
| | P | 5 | | 0 | |
| | P | 5 | | 1 | |
| | P | 5 | | 2 | |
| | P | 5 | | 3 | |
| ... | ... | ... | ... | ... | ... |

Fig. 11

| Deduplicated Block Location | Stored Matching Block Location |
|---|---|
| LBN B1 | LBN C1 |
| LBN B2 | LBN C2 |
| LBN B3 | LBN C3 |
| LBN B4 | LBN C4 |
| ... | ... |

Fig. 13

DEDUPLICATION OF DATA ON DISK DEVICES BASED ON A THRESHOLD NUMBER OF SEQUENTIAL BLOCKS

FIELD OF THE INVENTION

The present invention relates to storage systems, and particularly, to deduplication of data on disk devices based on a threshold number of sequential blocks.

BACKGROUND OF THE INVENTION

A storage system is a processing system adapted to store and retrieve information/data on storage devices (such as disks). The storage system includes a storage operating system that implements a file system to logically organize the information as a hierarchical structure of directories and files on the storage devices. Each file may comprise a set of data blocks, whereas each directory may be implemented as a specially-formatted file in which information about other files and directories are stored.

The storage operating system generally refers to the computer-executable code operable on a storage system that manages data access and access requests (read or write requests requiring input/output operations) and may implement file system semantics in implementations involving storage systems. In this sense, the Data ONTAP® storage operating system, available from Network Appliance, Inc. of Sunnyvale, Calif., which implements a Write Anywhere File Layout (WAFL®) file system, is an example of such a storage operating system implemented as a microkernel within an overall protocol stack and associated storage. The storage operating system can also be implemented as an application program operating over a general-purpose operating system, such as UNIX® or Windows®, or as a general-purpose operating system with configurable functionality, which is configured for storage applications as described herein.

A storage system's storage is typically implemented as one or more storage volumes that comprise physical storage devices, defining an overall logical arrangement of storage space. Available storage system implementations can serve a large number of discrete volumes. A storage volume is "loaded" in the storage system by copying the logical organization of the volume's files, data, and directories, into the storage system's memory. Once a volume has been loaded in memory, the volume may be "mounted" by one or more users, applications, devices, and the like, that are permitted to access its contents and navigate its namespace.

A storage system may be configured to allow server systems to access its contents, for example, to read or write data to the storage system. A server system may execute an application that "connects" to the storage system over a computer network, such as a shared local area network (LAN), wide area network (WAN), or virtual private network (VPN) implemented over a public network such as the Internet. The application executing on the server system may send an access request (read or write request) to the storage system for accessing particular data stored on the storage system.

The storage system may implement deduplication methods when storing data on the storage devices. Deduplication methods may be used to remove redundant data and to ensure that only a single instance of the same data is stored on the storage devices. Rather than storing multiple copies of the same data on the storage devices, a single instance of the data is typically stored and referenced/indexed multiple times. Since redundant data is removed, deduplication of data typically saves storage space.

Deduplication of data, however, may also cause longer read latencies when reading data that has been deduplicated. For example, when a file to be written to the storage devices is received, any blocks of the received file that match any blocks currently stored in the storage devices are typically considered redundant blocks and are deduplicated (i.e., are deleted from or not stored to the storage devices and a reference/index to the address location of the matching stored blocks is produced in their place). Any non-redundant blocks in the received file are written to the storage devices. When a read request for the received file is later received, the storage system performs the read request by retrieving the stored non-redundant blocks and, for each redundant block, uses the reference/index produced for the redundant block to seek and retrieve its matching stored block.

However, when the storage devices comprise disk devices, the matching stored blocks may be written on particular tracks of a platter of the disk device, whereas the non-redundant blocks of the received file are typically written on different tracks of the disk device. When reading blocks from the same track, a read/write head of the disk device typically exhibits low latency times as it may quickly retrieve the blocks sequentially from the same track. When reading blocks from different tracks, however, a read/write head of the disk device incurs significant seek times each time it repositions onto a different track to retrieve a block of data.

Since deduplication of data is typically performed on a single-block basis (whereby each individual block found to be redundant is deduplicated), later reading of the received file may incur significant read latency if the read/write head frequently seeks and retrieves single blocks stored on different tracks. For example, later reading of the received file may comprise retrieving non-redundant blocks on a first track, seeking and retrieving a single matching stored block on a second track, then seeking and retrieving non-redundant blocks on the first track, then seeking and retrieving a single matching stored block on the second track, etc.

As such, conventional use of deduplication on a single-block basis on a disk device may later cause significant read latency as the read/write head of the disk device repositions back and forth between different tracks to seek and retrieve single matching blocks. As such, there is a need for a method and apparatus for utilizing deduplication of data on disk devices that mitigates the later read latency of the data.

SUMMARY OF THE INVENTION

A method and apparatus for deduplication of data on disk devices based on a predetermined threshold number (THN) of sequential blocks is described herein, the threshold number being two or greater. In these embodiments, deduplication may be performed by determining whether a series of THN or more received blocks match (in data content) a sequence of THN or more stored blocks. A sequence of blocks may comprise blocks stored on the same track of a disk device. As such, a sequence of blocks may comprise blocks having consecutive address locations (e.g., logical block numbers). If a matching sequence of THN or more stored blocks is found to exist, the series of THN or more received blocks may be deduplicated. Deduplication based on a threshold number of sequential blocks may reduce the overall read latency of a file or set of blocks as the number of seeks between tracks may be reduced.

For example, if the value of THN equals 5 and a series of 10 blocks (numbered 0-9) is received, deduplication of the received blocks may be performed when a series of 5 or more of the received blocks match a sequence of 5 or more stored blocks (i.e., 5 or more blocks stored on the same track on a disk device). Thus if the series of received blocks 3-7 match a sequence of any 5 currently stored blocks, the series of received blocks 3-7 are considered redundant and is deduplicated (i.e., are deleted from or not stored to storage devices and an index to the address location of the matching stored blocks is produced in a mapping mechanism).

Therefore, for example, non-redundant blocks 0-2 may be stored on a first track, the sequence of 5 matching stored blocks may be stored on a second track, and non-redundant blocks 8-9 may also be stored on the first track of a disk device. As such, upon later reading of the received blocks, the read/write head of the disk device would retrieve non-redundant blocks 0-2 on the first track, seek and retrieve the sequence of 5 matching stored blocks on the second track, and seek and retrieve non-redundant blocks 8-9 on the first track. As such, when a seek to a different track is performed, the seek is performed to retrieve more than just a single block. Thus, the time cost of the seek is spread over THN or more blocks.

In some embodiments, deduplication is performed using a block-comparison mechanism and a mapping mechanism. It is determined if a series of THN or more received blocks match a sequence of THN or more stored blocks by querying the block-comparison mechanism. The block-comparison mechanism may comprise metadata entries of currently stored blocks. The received blocks may also be processed to create new metadata entries in the block-comparison mechanism.

Based on the results of the query to the block-comparison mechanism, a series of THN or more of the received blocks may be deduplicated. If so, indexes to the sequence of THN or more matching stored blocks are produced in the mapping mechanism which is used to record mappings of deduplicated redundant blocks to their corresponding matching stored blocks. The mapping mechanism may be used to perform later read requests received for deduplicated redundant blocks.

BRIEF DESCRIPTION OF THE DRAWINGS

The novel features are set forth in the appended claims. However, for purpose of explanation, several embodiments of the invention are set forth in the following figures.

FIG. 4 is a conceptual diagram of storage-side layers of the storage operating system;

FIG. 5 is a conceptual diagram of storage-side layers of the storage operating system comprising a de-staging layer;

FIG. 11 shows a conceptual diagram of an exemplary block-comparison mechanism comprising a metadata structure;

FIG. 13 shows a conceptual diagram of an exemplary mapping mechanism comprising a metadata structure;

DETAILED DESCRIPTION

In the following description, numerous details are set forth for purpose of explanation. However, one of ordinary skill in the art will realize that the embodiments described herein may be practiced without the use of these specific details. In other instances, well-known structures and devices are shown in block diagram form in order not to obscure the description with unnecessary detail.

The description that follows is divided into four sections. Section I describes a storage system environment in which some embodiments operate. Section II describes deduplication of data on disk devices based on a threshold number of sequential blocks. Section III describes block-comparison and mapping mechanisms used for deduplication of data. Section IV describes methods for implementing deduplication of data on disk devices based on a threshold number of sequential blocks.

I. Storage System Environment

Figure 1:
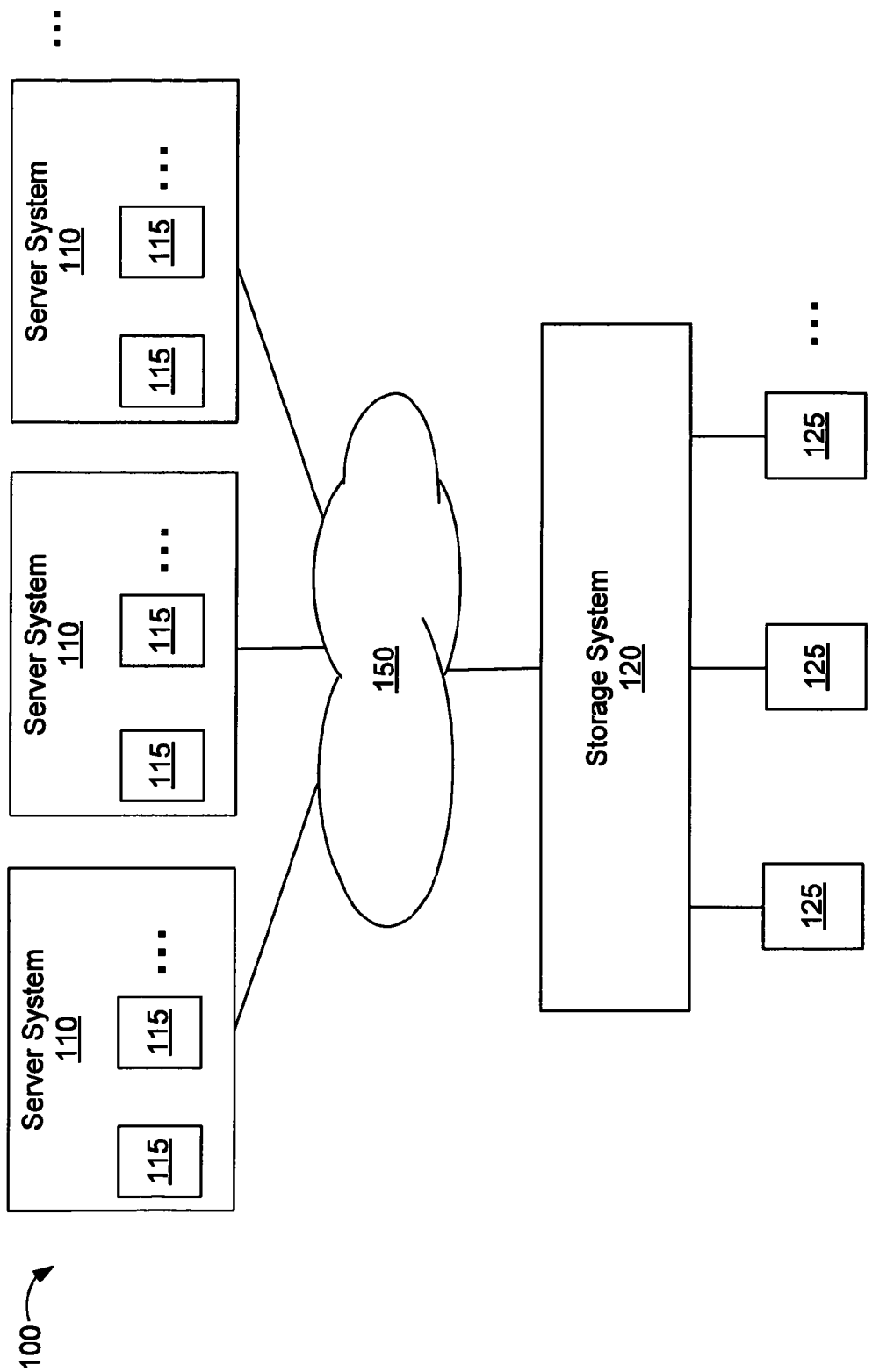
FIG. 1 is a schematic block diagram of an exemplary storage system environment in which some embodiments operate.

FIG. 1 is a schematic block diagram of an exemplary storage system environment 100 in which some embodiments operate. The environment 100 comprises a one or more server systems 110 and a storage system 120 (comprising one or more storage devices 125) that are connected via a connection system 150. The connection system 150 may comprise a network, such as a Local Area Network (LAN), Wide Area Network (WAN), metropolitan area network (MAN), the Internet, or any other type of network or communication system between computer systems.

A server system 110 may comprise a computer system that utilizes services of the storage system 120 to store and manage data in the storage devices 125 of the storage system 120. A server system 110 may execute one or more applications 115 that submit read/write requests for reading/writing data on the storage devices 125 of the storage system 120. In some embodiments, the storage system 120 may receive read/write requests from two or more applications 115 (executing on one or more server systems 110) simultaneously. The two or more applications 115 may be accessing different sets of storage devices 125 or volumes of the storage system 120.

Interaction between a server system 110 and the storage system 120 can enable the provision of storage services. That is, server system 110 may request the services of the storage system 120 (e.g., through read or write requests), and the storage system 120 may perform the requests and return the results of the services requested by the server system 110, by exchanging packets over the connection system 150. The server system 110 may issue access requests (e.g., read or write requests) by issuing packets using file-based access protocols, such as the Common Internet File System (CIFS) protocol or Network File System (NFS) protocol, over the Transmission Control Protocol/Internet Protocol (TCP/IP) when accessing data in the form of files and directories. Alternatively, the server system 110 may issue access requests by issuing packets using block-based access protocols, such as the Fibre Channel Protocol (FCP), or Internet Small Computer System Interface (iSCSI) Storage Area Network (SAN) access, when accessing data in the form of blocks.

The storage system 120 may comprise a computer system that stores data in a set of one or more storage devices 125. A storage device 125 may comprise a writable storage device media, such as disk devices, video tape, optical, DVD, magnetic tape, and any other similar media adapted to store information (including data and parity information). In some embodiments, a storage device 125 comprises a disk device (described in detail below). In other embodiments, the storage device 125 may comprise any other type of storage device.

The storage system 120 may implement a file system to logically organize the data as a hierarchical structure of directories and files on each storage device 125. Each file may be implemented as a set of blocks configured to store data, whereas each directory may be implemented as a specially-formatted file in which information about other files and directories are stored. A block of a file may comprise a fixed-sized amount of data that comprises the smallest amount of storage space that may be accessed (read or written) on a storage device 125. The block may vary widely in data size (e.g., 1 byte, 4-kilobytes (KB), 8 KB, etc.).

Figure 2:
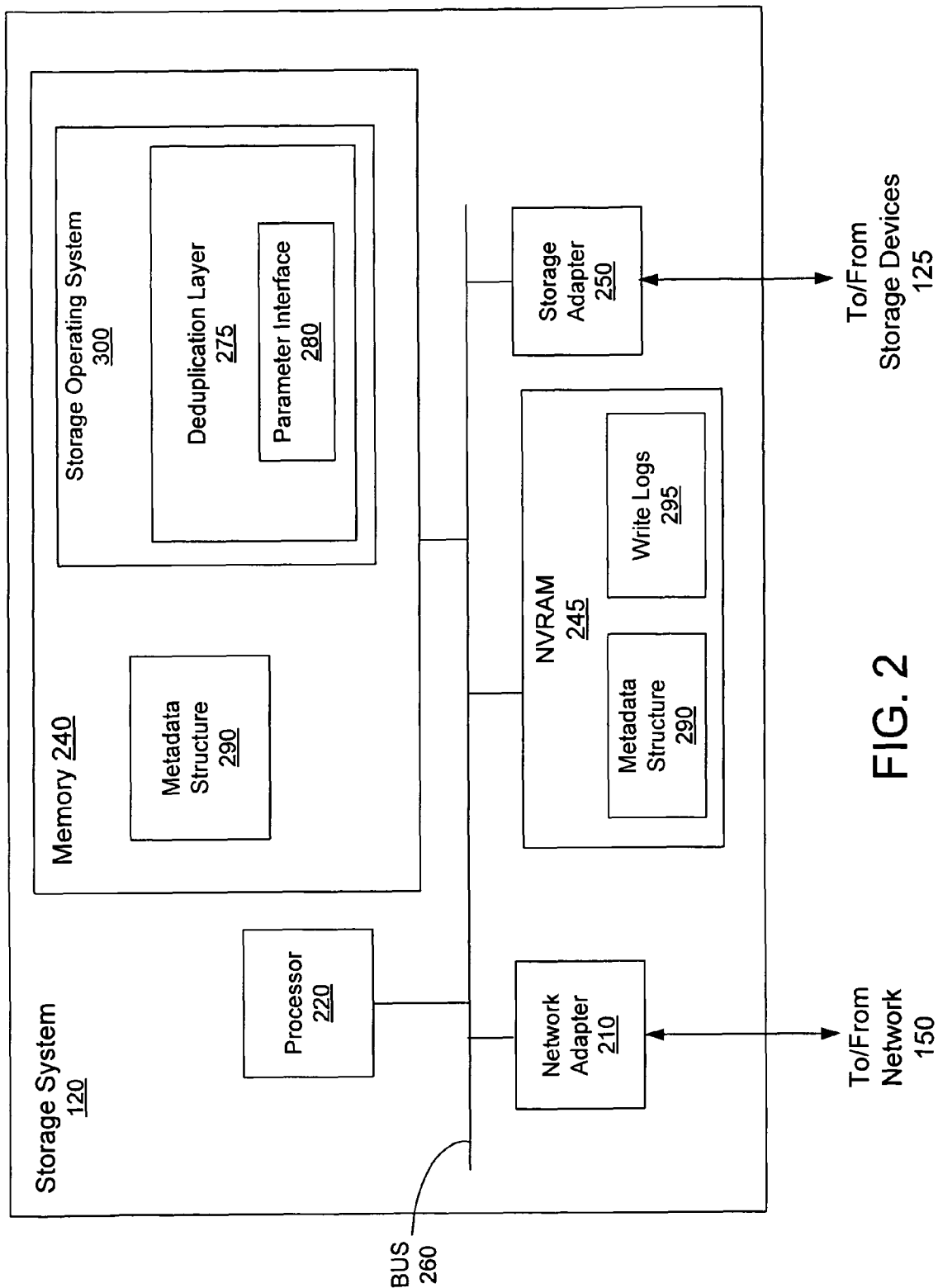
FIG. 2 is a schematic block diagram of an exemplary storage system that may be employed in the storage system environment of FIG. 1.

FIG. 2 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a standalone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a server computer. The term "storage system" should, therefore, be taken broadly to include such arrangements.

The storage system 120 comprises a network adapter 210, a processor 220, a memory 240, a non-volatile random access memory (NVRAM) 245, and a storage adapter 250 interconnected by a system bus 260. The network adapter 210 comprises the mechanical, electrical and signaling circuitry needed to connect the storage system 120 to a server system 110 over a computer network 150. The storage system may include one or more network adapters. Each network adapter 210 has a unique IP address and may provide one or more data access ports for server systems 110 to access the storage system 120 (where the network adapter accepts read/write access requests from the server systems 110 in the form of data packets).

The memory 240 comprises storage locations that are addressable by the processor 220 and adapters for storing software program code and data. The memory 240 may comprise a form of random access memory (RAM) that is generally cleared by a power cycle or other reboot operation (e.g., it is a "volatile" memory). In other embodiments, however, the memory 240 may comprise a non-volatile form of memory that does not require power to maintain information.

The processor 220 and adapters may, in turn, comprise processing elements and/or logic circuitry configured to execute the software code and manipulate the data stored in the memory 240.

The storage system 120 may also include a NVRAM 245 that may be employed as a backup memory that ensures that the storage system 120 does not "lose" received information, e.g., CIFS and NFS requests, in the event of a system shutdown or other unforeseen problem. The NVRAM 245 is typically a large-volume solid-state memory array (RAM) having either a back-up battery, or other built-in last-state-retention capabilities (e.g. a FLASH memory), that holds the last state of the memory in the event of any power loss to the array. Therefore, even if an access request stored in memory 240 is lost or erased (e.g., due to a temporary power outage) it still may be recovered from the NVRAM 245.

The processor 220 executes a storage operating system application 300 of the storage system 120 that functionally organizes the storage system by, inter alia, invoking storage operations in support of a file service implemented by the storage system. In some embodiments, the storage operating system 300 comprises a plurality of software layers (including a deduplication layer 275) that are executed by the processor 220. In some embodiments, the deduplication layer 275 is implemented to deduplicate data based on a threshold number of sequential blocks. Portions of the storage operating system 300 are typically resident in memory 240. It will be apparent to those skilled in the art, however, that other processing and memory means, including various computer readable media, may be used for storing and executing program instructions pertaining to the storage operating system 300.

In some embodiments, a metadata structure 290 is also resident in memory 240. In other embodiments, the metadata structure 290 may also be resident in NVRAM 245 or stored on a storage device 125. As discussed below, in some embodiments, the metadata structure 290 is produced and used by the deduplication layer 275 to store metadata for sequences of stored blocks and is used to determine whether received blocks match any stored blocks. In these embodiments, the metadata structure 290 is sometimes referred to as a block-comparison mechanism. In other embodiments, the metadata structure 290 is also used by the deduplication layer 275 to record mappings of deduplicated redundant blocks to their corresponding matching stored blocks. In these embodiments, the metadata structure 290 is sometimes also referred to as a mapping mechanism.

The storage adapter 250 cooperates with the storage operating system 300 executing on the storage system 120 to access data requested by the server system 110. The data may be stored on the storage devices 125 that are attached, via the storage adapter 250, to the storage system 120 or other node of a storage system as defined herein. The storage adapter 250 includes input/output (I/O) interface circuitry that couples to the storage devices 125 over an I/O interconnect arrangement, such as a conventional high-performance, Fibre Channel serial link topology. In response to an access request received from a server system 110, data may be retrieved by the storage adapter 250 and, if necessary, processed by the processor 220 (or the adapter 250 itself) prior to being forwarded over the system bus 260 to the network adapter 210, where the data may be formatted into a packet and returned to the server system 110.

In an illustrative embodiment, the storage devices 125 may comprise disk devices that are arranged into a plurality of volumes, each having a file system associated therewith. In some embodiments, the storage devices 125 comprise disk devices that are configured into a plurality of RAID (redundant array of independent disks) groups whereby multiple storage devices 125 are combined into a single logical unit (i.e., RAID group). In a typical RAID group, storage devices 125 of the group share or replicate data among the disks which may increase data reliability or performance. The storage devices 125 of a RAID group are configured so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. A single volume typically comprises a plurality of storage devices 125 and may be embodied as a plurality of RAID groups.

The organization of a storage operating system 300 for the exemplary storage system 120 is now described briefly. However, it is expressly contemplated that the principles of the embodiments described herein can be implemented using a variety of alternative storage operating system architectures. As discussed above, the term "storage operating system" as used herein with respect to a storage system generally refers to the computer-executable code operable on a storage system that implements file system semantics (such as the above-referenced WAFL®) and manages data access. In this sense, Data ONTAP® software is an example of such a storage operating system implemented as a microkernel. The storage operating system can also be implemented as an application program operating over a general-purpose operating system, such as UNIX® or Windows®, or as a general-purpose operating system with configurable functionality.

Figure 3:
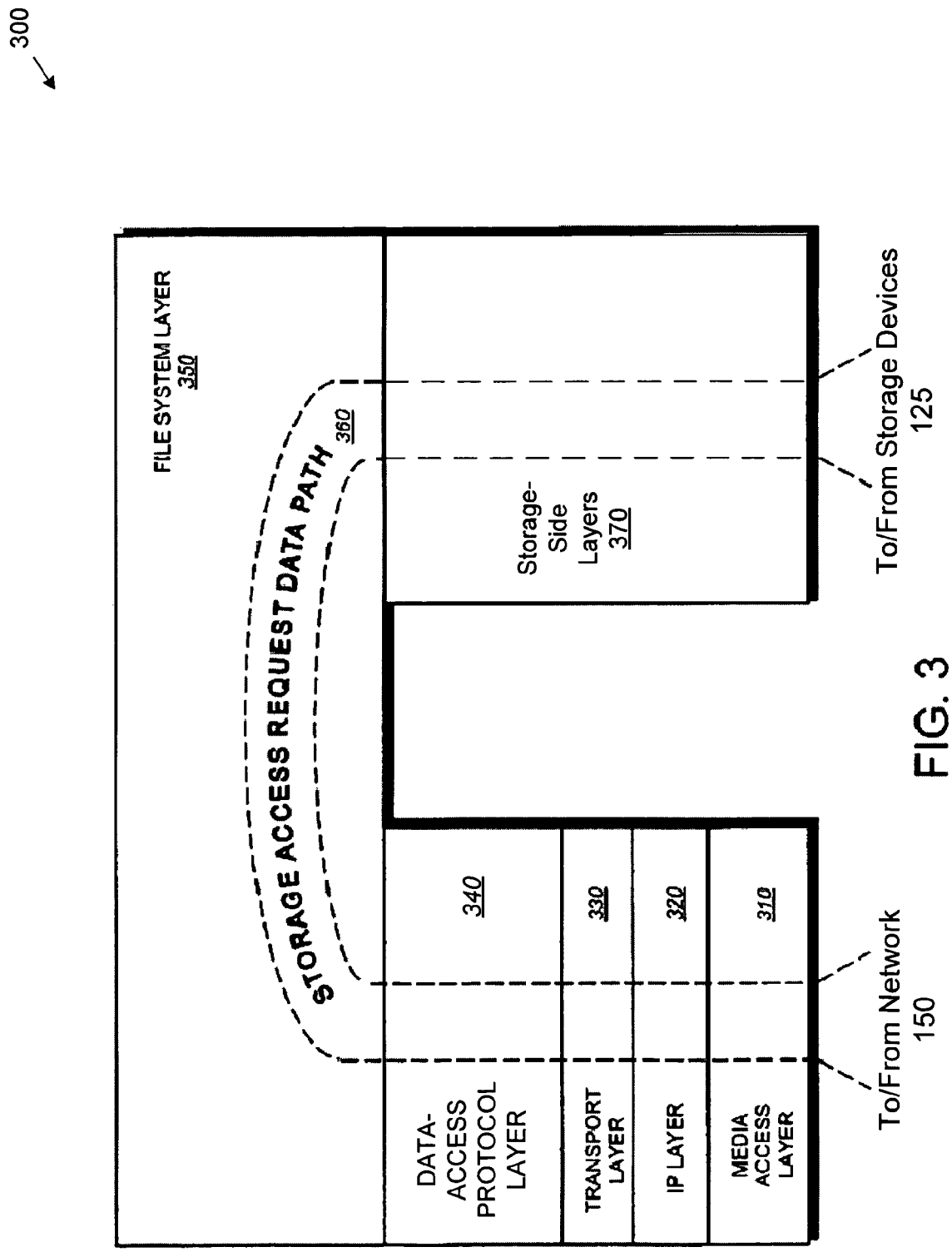
FIG. 3 is a schematic block diagram of an exemplary storage operating system that may be implemented by the storage system in FIG. 2.

As shown in FIG. 3, the storage operating system 300 comprises a set of software layers that form an integrated protocol software stack. The protocol stack provides data paths 360 for server systems 110 to access data stored on the storage system 120 using data-access protocols. The protocol stack includes a media access layer 310 of network drivers (e.g., an Ethernet driver). The media access layer 310 interfaces with network communication and protocol layers, such as the Internet Protocol (IP) layer 320 and the transport layer 330 (e.g., TCP/UDP protocol). The IP layer 320 may be used to provide one or more data access ports for server systems 110 to access the storage system 120. In some embodiments, the IP layer 320 layer provides a dedicated private port for each of one or more remote-file access protocols implemented by the storage system 120.

A data-access protocol layer 340 provides multi-protocol data access and, for example, may include file-based access protocols, such as the Hypertext Transfer Protocol (HTTP) protocol, the NFS protocol, the CIFS protocol, and so forth. The storage operating system 300 may include support for other protocols, such as block-based access protocols. Such protocols may include, but are not limited to, the direct access file system (DAFS) protocol, the web-based distributed authoring and versioning (WebDAV) protocol, the Fibre Channel Protocol (FCP), the Internet small computer system interface (iSCSI) protocol, and so forth.

The storage operating system 300 may manage the storage devices 125 using storage-side layers 370. As shown in FIG. 4, the storage-side layers 370 may include a storage layer 380 that implements a storage protocol (such as a RAID protocol) and a device driver layer 385 that implements a device control protocol (such as small computer system interface (SCSI), integrated drive electronics (IDE), etc.). Bridging the storage-side layers 370 with the network and protocol layers is a file system layer 350 of the storage operating system 300. In an illustrative embodiment, the file system layer 350 implements a file system having an on-disk format representation that is block-based using inodes to describe the files.

The file system layer 350 assigns, for each file, a unique inode number and an associated inode. An inode may comprise a data structure used to store metadata information about the file (such as name of the file, when the file was produced or last modified, ownership of the file, access permission for the file, size of the file, etc.). Each inode may also contain information regarding the block locations of the file. In some embodiments, the block locations are indicated by a unique logical block number (LBN) given for each block of the file. As discussed below, if a storage device comprises a disk device, a set of blocks having sequential LBNs indicates that the set of blocks are stored sequentially on a same track of the disk device. The file system 350 may store and maintain an inode file that contains and indexes (by inode number) the inodes of the various files.

In response to receiving a file-access request (containing an external file handle) from a server system 110, the file system 350 generates operations to load (retrieve) the requested data from storage devices 125 (if it is not resident in the storage system's memory 240). The external file handle in the access request typically identifies a file or directory requested by the server system 110. Specifically, the file handle may specify a generation number, inode number and volume number corresponding to the requested data. If the information is not resident in the storage system's memory 240, the file system layer 350 indexes into the inode file using the received inode number to access the appropriate inode entry for the identified file and retrieve file location information (e.g., logical block number) from the inode.

The file system layer 350 then passes the logical block number to the appropriate driver (for example, an encapsulation of SCSI implemented on a fibre channel interconnection) of the device driver layer 385. The device driver layer 385 accesses the appropriate blocks from the storage devices 125 and loads the requested data in memory 240 for processing by the storage system 120. Upon successful completion of the request, the storage system (and storage operating system) returns a response (e.g., a conventional acknowledgement packet defined by the CIFS specification) to the server system 110 over the network 150.

It should be noted that the software "path" 360 through the storage operating system layers described above needed to perform data storage access for the requests received at the storage system may alternatively be implemented in hardware or a combination of hardware and software. That is, in an alternative embodiment, the storage access request path 360 may be implemented as logic circuitry embodied within a field programmable gate array (FPGA) or an application specific integrated circuit (ASIC). This type of hardware implementation may increase the performance of the file service provided by storage system 120 in response to a file system request packet issued by server system 110. Moreover, in a further embodiment, the processing elements of network and storage adapters 210 and 250 may be configured to offload some or all of the packet processing and storage access operations, respectively, from processor 220 to thereby increase the performance of the data access service provided by the storage system 120.

In some embodiments, the storage operating system 300 also comprises a deduplication layer 275 that operates in conjunction with the other software layers and file system of the storage operating system 300 to deduplicate data stored on the storage system 120 as described herein. For example, in some embodiments, the deduplication layer 275 may reside between the file system layer 350 and the storage layer 380 of the storage operating system 300 (as shown in FIGS. 3 and 4).

In other embodiments, the deduplication layer 275 may reside near other layers of the storage operating system 300.

In some embodiments, the storage-side layers 370 also include a de-staging layer 375 (as shown in FIG. 5). For example, in some embodiments, the de-staging layer 375 may reside between the file system layer 350 and the deduplication layer 275 of the storage operating system 300 (as shown in FIGS. 3 and 5). In other embodiments, the de-staging layer 375 may reside near other layers of the storage operating system 300.

The de-staging layer 375 may be implemented in some storage systems 125 to perform received write requests for files in two stages. In a first stage, write requests received by the file system layer 350 are sent to the de-staging layer 375, a write request containing blocks of data to be written. The de-staging layer 375 produces a write log for each received write request, a write log containing the blocks of data to be written. The write logs 295 may be stored, for example, to the NVRAM 245 (as shown in FIG. 2). In a second stage, at predetermined time intervals (referred to as consistency points), accumulated write logs 295 (e.g., in the NVRAM 245) are sent to the storage layer 380 which then writes the blocks of data in the write logs to a storage device 125.

Embodiments described herein may be applied to a storage system 120 that is implemented with or with out a de-staging layer 375. In some embodiments, the deduplication layer 275 is used in conjunction with the de-staging layer 375. In these embodiments, the deduplication layer 275 may process the write logs accumulated during the first stage that are awaiting the next consistency point to be written to a storage device 125. During this time, the deduplication layer 275 may process the blocks in the accumulated write logs for possible deduplication before the blocks are written to the storage devices 125. In other embodiments, the deduplication layer 275 is used without use of a de-staging layer 375. In these embodiments, the deduplication layer 275 may receive write requests from the file system 350 and process blocks of the write requests for deduplication as they are received.

Note that when a write log for a write request for a file is produced in the first stage, the file system layer 350 may assign LBNs for each block in the file to be written, the assigned LBN of a block indicating the location on a storage device 125 where the block will be written to at the next consistency point. Also, the file system layer 350 may assign an inode number and an inode for the file. As such, each write log may comprise blocks of data to be written, the locations (LBNs) of where the blocks are to be written, and an inode number assigned to the file. When a write log for a write request for a file is produced in the first stage, the file system layer 350 may also store LBNs for the blocks of the file in its assigned inode.

In other embodiments where the deduplication layer 275 is used without the de-staging layer 375, the deduplication layer 275 may receive write requests for files from the file system 350, whereby the file system layer 350 may assign LBNs for each block in the file to be written. Also, the file system layer 350 may assign an inode number and an inode for the file and store the assigned LBN for the blocks of the file in its assigned inode.

In some embodiments, the deduplication layer 275 may be pre-included in storage operating system 300 software. In other embodiments, the deduplication layer 275 may comprise an external auxiliary plug-in type software module that works with the storage operating system 300 to enhance its functions. As such, the deduplication layer 275 may be imposed upon an existing storage operating system 300 and file system 350 to provide deduplication of data as described herein.

II. Deduplication of Data on Disk Devices
A. Single-Block Deduplication

The storage system 120 may implement deduplication methods when storing data on the storage devices 125. Deduplication methods may be used to remove redundant data and ensure that only a single instance of the same data is stored on the storage devices. Rather than storing multiple copies of the same data on the storage devices, a single instance of the data is typically stored and referenced/indexed multiple times. Deduplication of data may be applied at any level, for example, across a single storage device 125 or volume (where redundant data within the single storage device 125 or volume are removed), across multiple storage devices 125 or volumes (where redundant data within multiple storage devices 125 or volumes are removed), across the entire storage system 120 (where redundant data within the storage system 120 are removed), across multiple storage systems 120 (where redundant data within the multiple storage systems 120 are removed), and so forth. Since redundant data is removed, deduplication of data typically saves storage space. Deduplication of data, however, may also cause longer read latencies when reading data that has been deduplicated on a disk device.

Figure 6:
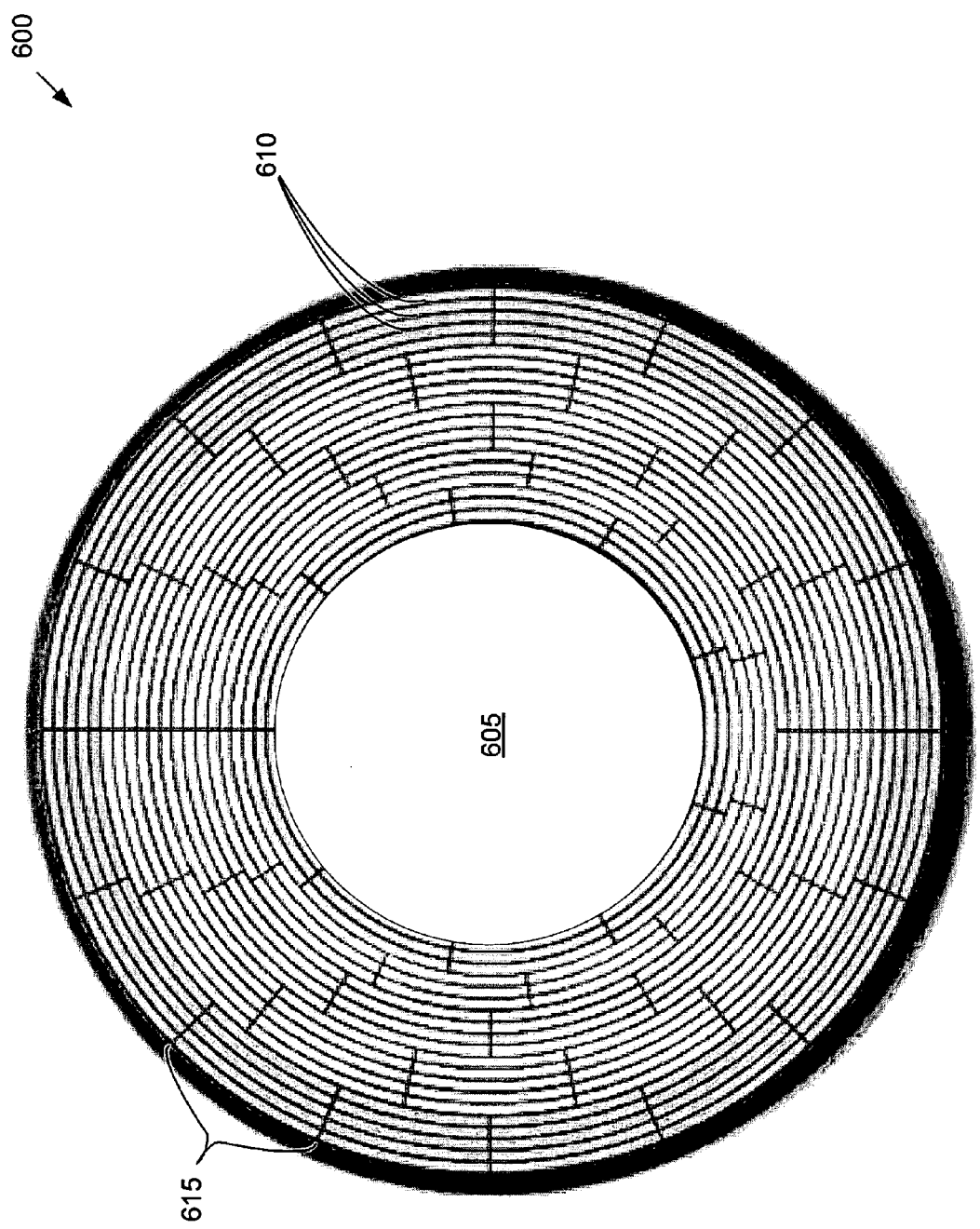
FIG. 6 is a conceptual representation of a disk platter of a disk device.

As known in the art, a disk device comprises a plurality of stacked platters, each platter having a read/write head that retrieves and writes data to the platter. FIG. 6 shows a conceptual representation of a disk platter 605 that comprises a plurality of tracks 610 (shown as concentric circles), each track being divided into a plurality of sectors/blocks 615 (shown as segments of the concentric circles). As used herein, a "block" may comprise any size of data (e.g., 1 byte, 4 KB, 8 KB, etc.).

Each block that is stored in the storage system 120 is typically assigned a unique logical block number (LBN) by the file system 350. The LBNs of a set of blocks may reflect the physical storage locations of the blocks relative to each other on a storage device 125. In particular, a set of blocks having sequential LBNs indicates that the set of blocks are stored sequentially on a same track of a disk device. For example, blocks having LBNs 234, 235, and 236 indicates that the blocks are stored sequentially on the same track of a disk device. In the embodiments described below, the locations of a set of blocks are indicated by LBNs. However, in other embodiments, the locations of a set of blocks are indicated by another type of number (other than LBN) that reflects the physical storage locations of the blocks relative to each other on a disk device.

As used herein, blocks 615 on a disk platter 605 are accessed "sequentially" when they are accessed from the same track 610 in order (i.e., accessed one after another along the same track). When reading blocks sequentially from the same track, the read/write head of the disk device typically exhibits low latency times. As used herein, blocks 615 on a disk platter 605 are accessed "randomly" when they are accessed from different tracks 610. When reading blocks from different tracks, the read/write head of the disk device may incur significant latency time each time it repositions onto a different track to retrieve a block of data. As used herein, the read/write head performs a "seek" when moving to a different track which incurs a "seek time" latency.

Read latency may be incurred when using conventional "single-block" deduplication methods. For example, when a file to be written to the storage devices is received, a comparison is performed to determine whether any of the blocks of the received file match any blocks currently stored in the storage devices. As used herein, a "received" file comprises a "received" set of blocks that are processed for deduplication. The received blocks are compared to "currently stored" blocks of "currently stored" files that are presently stored on the storage system 120. Note that in some situations (e.g., in offline processing), received blocks may also be currently stored on the storage system 120. In these embodiments, currently stored blocks may be compared to other currently stored blocks to determine if any of the currently stored blocks may be deduplicated.

A received block that matches a currently stored block is referred to as a "redundant block," whereas the corresponding currently stored block is referred to as a "matching stored block." A received block that does not match any currently stored blocks is referred to as a "non-redundant block." A block may be considered to "match" another block when both blocks have the same content or there is a high probability that both blocks have the same content.

Deduplication of a redundant block may comprise deleting from or not storing the redundant block to the storage devices and, producing in their place, an index to the address location of the corresponding matching stored blocks (the index being produced, for example, in the inode for the received file). Any non-redundant blocks in the received file are written to the storage devices. For each written non-redundant block, an index to the address location of the non-redundant block where the block was stored may also be produced in the inode for the received file. When a read request for the received file is later received, the storage system may perform the read request by using the inode to index and retrieve the stored non-redundant blocks and, for each redundant block, the corresponding matching stored block.

When the storage devices 125 comprise disk devices, the matching stored blocks may be written on particular tracks 610 of the disk device, whereas the non-redundant blocks of the received file are typically written on different tracks of the disk device. Deduplication of data is typically performed on a single-block basis, whereby each individual block found to be redundant is deduplicated. As such, later reading of the received file (using the indexes to the matching stored blocks and non-redundant blocks in the inode for the file) may incur significant read latency if the read/write head frequently seeks and retrieves single blocks stored on different tracks. For example, later reading of the received file may comprise retrieving non-redundant blocks on a first track, seeking and retrieving a single matching stored block on a second track, then seeking and retrieving non-redundant blocks on the first track, then seeking and retrieving a single matching stored block on the second track, etc. As such, conventional "single-block" deduplication methods may result in a later read operation that incurs significant seek latencies.

B. Deduplication Based on a Threshold Number of Sequential Blocks

In some embodiments, deduplication of a received set of blocks is performed based on a predetermined threshold number (THN) of sequential blocks, the threshold number being two or greater. In these embodiments, deduplication may be performed by determining if a "series" of THN or more received blocks (referred to herein as a "THN series") match a "sequence" of THN or more currently stored blocks (referred to herein as a "THN sequence"). If a matching THN sequence is found to exist, the blocks in the THN series may be deduplicated. The number of blocks in the THN series may be equal to the number of blocks in the matching THN sequence. Other received blocks that are not deduplicated are referred to as "non-deduplicated" blocks. In some embodiments described below, for illustrative purposes, the value of THN equals 5, although in other embodiments, the value of THN may equal any other number of two or greater.

As used herein, a "series" of blocks indicates a set of consecutive/adjacent blocks in a predetermined order. As used herein, blocks of a series are numbered by consecutive "block-series numbers" (BSNs) that indicate the ordering of the blocks in the series. BSNs may be used below in relation to a series of received blocks. Note however, that a series of received blocks may also have associated LBNs assigned by the file system layer 350.

In some embodiments, a "sequence" of blocks indicates a series of blocks stored on the same track of a disk device. Blocks of a sequence have sequential/consecutive address locations (e.g., LBNs). For example, blocks of a sequence may be numbered by consecutive LBNs that indicate the ordering of the blocks in the sequence. In other embodiments, a sequence of blocks indicates a series of blocks that are assigned to be stored on the same track of a disk device and have assigned consecutive address locations (e.g., LBNs). Deduplication based on a threshold number of sequential blocks may reduce the overall read latency of a file or set of blocks as the number of seeks between tracks may be reduced (in comparison to deduplication based on single blocks).

For example, if the value of THN equals 5 and a series of 10 blocks with BSNs 0-9 are received, deduplication of the received blocks may be performed when a series of 5 or more of the received blocks match a sequence of 5 or more currently stored blocks (i.e., 5 or more blocks stored on the same track on a disk device). Thus if the series of received blocks having BSNs 3-7 match a sequence of any 5 currently stored blocks, the entire series of received blocks having BSNs 3-7 are considered redundant and is deduplicated (i.e., replaced by indexes to the sequence of 5 matching stored blocks). Therefore, for example, non-redundant blocks having BSNs 0-2 may be stored on a first track, the sequence of 5 matching stored blocks may be stored on a second track (the 5 matching stored blocks corresponding to redundant blocks having BSNs 3-7), and non-redundant blocks having BSNs 8-9 may also be stored on the first track of a disk device.

As such, upon later reading of the received blocks having BSNs 0-9, the read/write head of the disk device would retrieve non-redundant blocks having BSNs 0-2 on the first track, seek and retrieve the sequence of 5 matching stored blocks on the second track, and seek and retrieve non-redundant blocks having BSNs 8-9 on the first track. This example illustrates how read latency of the received blocks may be mitigated since there are fewer seek operations during the read. Further, when a seek to a different track is performed, the seek is performed to retrieve more than just a single block. Thus, the time cost of the seek is spread over THN or more blocks (in this example, the time cost is spread over 5 blocks), rather than just a single block.

In some embodiments, the deduplication methods described herein are performed by the deduplication layer 275 of the storage operating system 300. In some embodiments, received blocks are processed for deduplication prior to being written to a storage device 125 (referred to as online processing). In these embodiments, the deduplication layer 275 may receive blocks to be written and determine deduplication prior to any of the received blocks being written to a storage device 125. In online processing, storage space may be saved immediately and unnecessary write operations to storage devices 125 are avoided. In other embodiments, blocks are processed for deduplication after being written to a storage device 125 (referred to as offline processing). In these embodiments, the deduplication layer 275 may process blocks currently stored to the storage devices 125 to determine whether deduplication of the stored blocks is needed. In offline processing, if deduplication is performed on blocks found to be redundant, the redundant blocks may be deleted from the storage devices 125.

Figure 7:
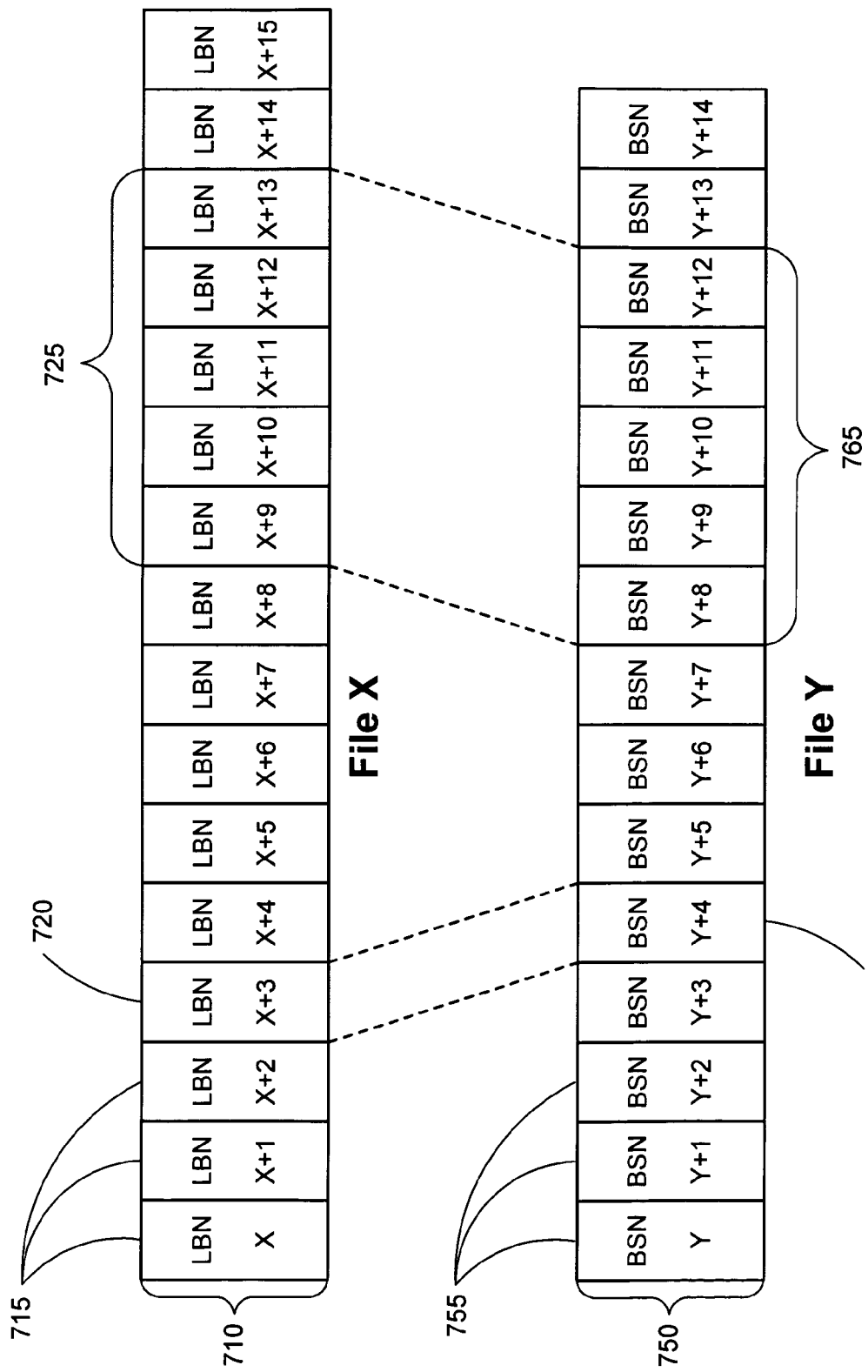
FIG. 7 shows a conceptual diagram of stored file X and received file Y.

FIGS. 7-10 are exemplary conceptual diagrams illustrating deduplication based on a threshold number of sequential blocks in accordance with some embodiments. FIG. 7 shows a conceptual diagram of a first file 710 ("file X") comprising a plurality of blocks 715 and a second file 750 ("file Y") comprising a plurality of blocks 755. In the example of FIG. 7, file X comprises a currently stored file comprising a sequence of 16 blocks 715 having sequential LBNs (X, X+1, X+2 . . . X+15), whereby X is the LBN of the first block in the sequence. As such, in the example of FIG. 7, the sequence of 16 blocks 715 are stored on a same track of a disk device. In the example of FIG. 7, file Y comprises a received file that is to be processed for deduplication. File Y comprises a series of 15 blocks 755 numbered by BSNs (Y, Y+1, Y+2 . . . Y+14) that indicate the ordering of the blocks in the series, whereby Y is the BSN of the first block in the series.

For example, if the threshold number (THN) equals 5, deduplication of any of the blocks 755 of received file Y may be performed when a series of 5 or more blocks 755 match a sequence of 5 or more blocks 715 in currently stored file X. In the example of FIG. 7, block BSN (Y+4) 760 of file Y matches block LBN (X+3) 720 of file X. However, since this match comprises a single-block match that is below the threshold number (THN) of 5 sequential blocks, block BSN (Y+4) 760 of file Y is not deduplicated.

In the example of FIG. 7, the series of blocks BSN (Y+8) through BSN (Y+12) 765 of file Y matches the sequence of blocks LBN (X+9) through LBN (X+13) 725 of file X. Since this match comprises a match that is equal to or above the threshold number (THN) of 5 sequential blocks, the series of blocks 765 of file Y are considered redundant blocks and marked for deduplication. When deduplicating the series of redundant blocks 765, the series of redundant blocks 765 are deleted from or not stored to the storage devices 125 and indexes to the address locations (e.g., LBNs) of the sequence of matching blocks 725 are produced in their place.

Figure 8:
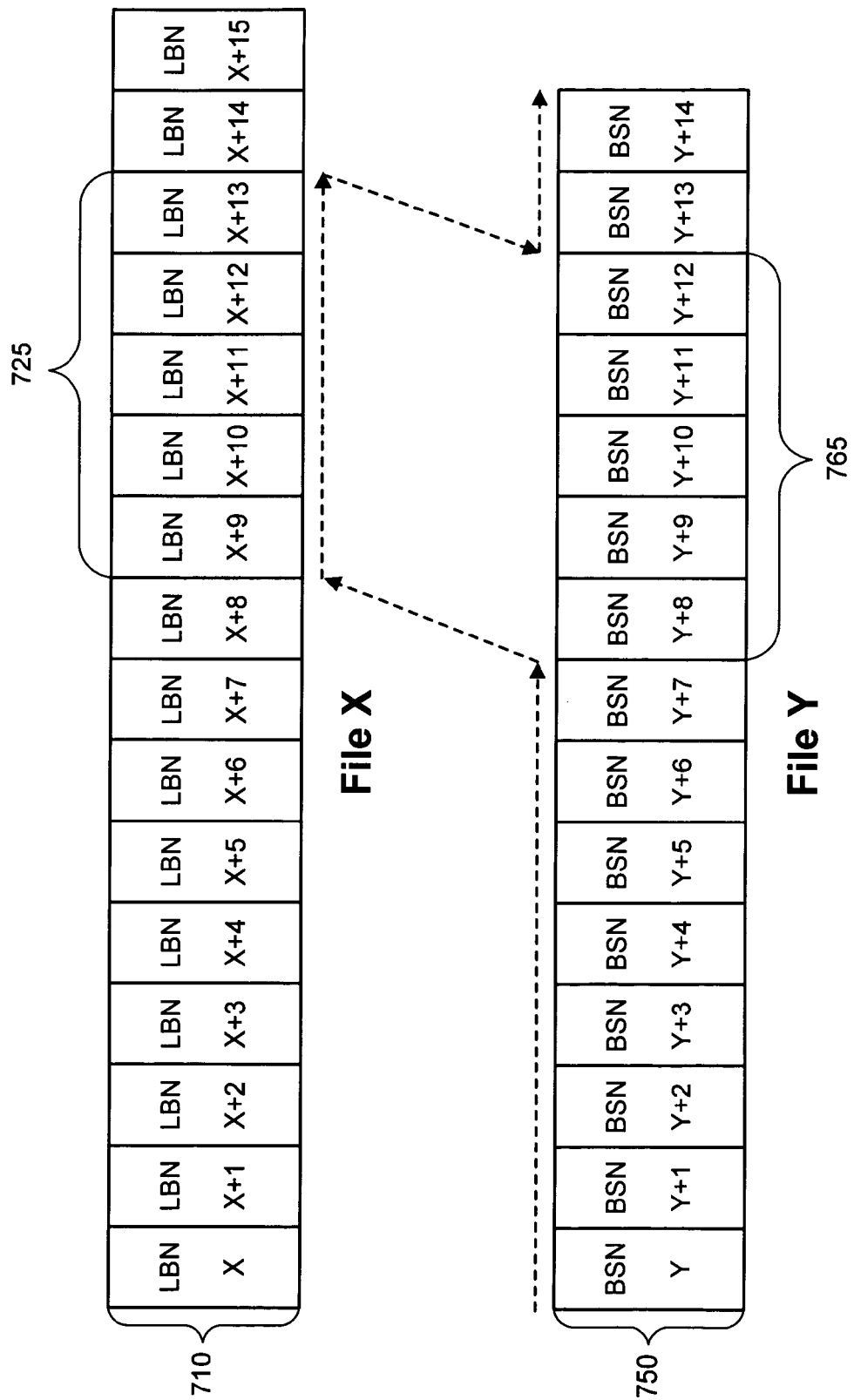
FIG. 8 shows a conceptual diagram of the blocks that comprise the received file Y after deduplication of a series of redundant blocks.

FIG. 8 shows a conceptual diagram of the blocks that will comprise the received file Y after deduplication of the series of redundant blocks 765 is performed. As shown in FIG. 8, the received file Y will comprise blocks BSN (Y) through BSN (Y+7), the matching sequence of blocks LBN (X+9) through LBN (X+13) 725, and blocks BSN (Y+13) through BSN (Y+14).

Figure 9:
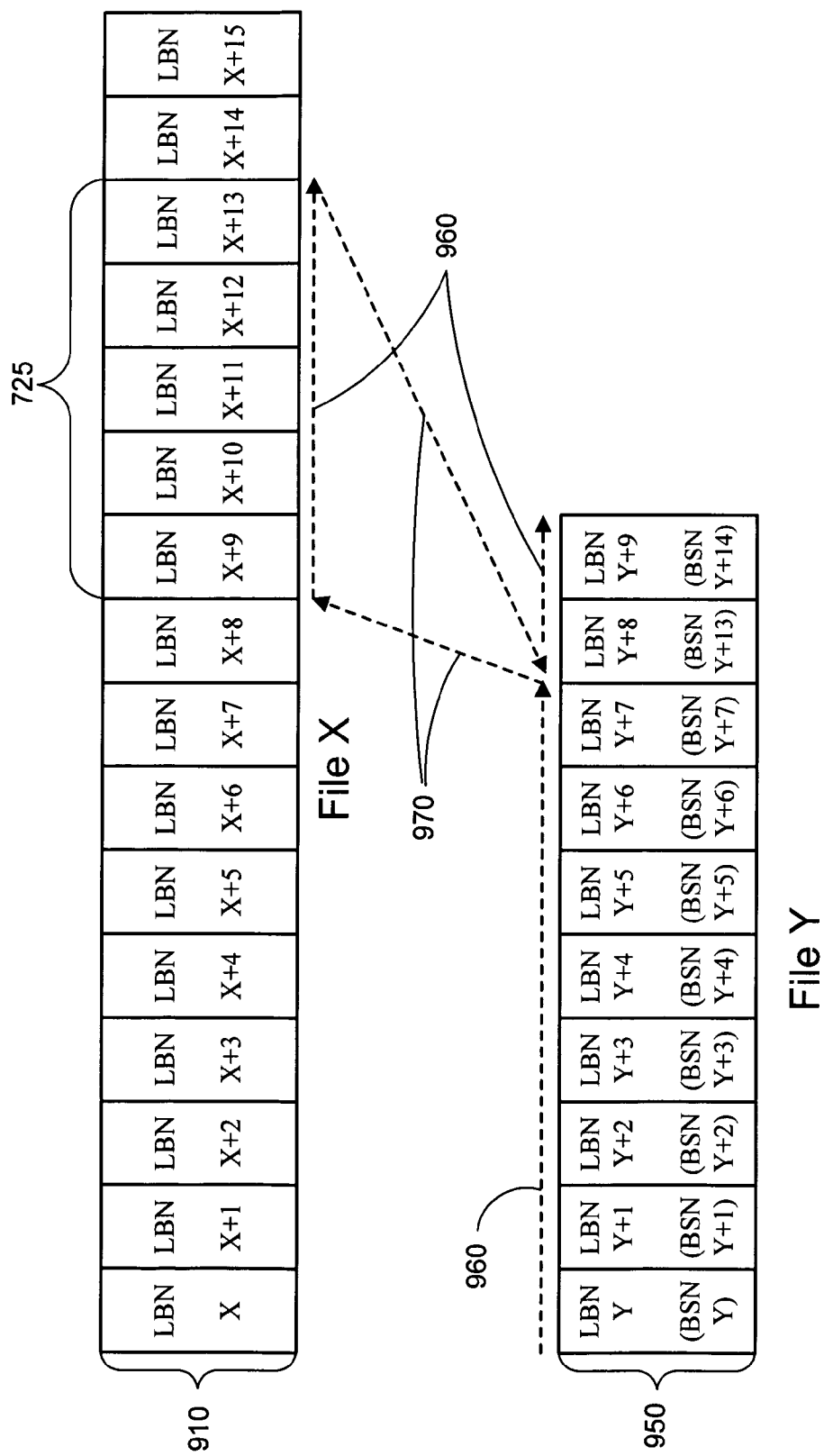
FIG. 9 shows a conceptual diagram of the storage and reading of file Y.

FIG. 9 shows a conceptual diagram of the storage of the blocks of file Y and the operations of a read request for file Y. In the example of FIG. 9, blocks BSN (Y) through BSN (Y+7) of file Y are stored on a first track 950 of a disk device, the blocks having LBNs (Y) through LBN (Y+7). The matching sequence of blocks LBN (X+9) through LBN (X+13) 725 of file X may be stored on a second track 910 of the disk device (the matching sequence of blocks 725 corresponding to the series of redundant blocks 765 of file Y). Blocks BSN (Y+13) through BSN (Y+14) of file Y may also be stored on the first track 950 of the disk device, the blocks having LBNs (Y+8) through LBN (Y+9).

Figure 10:
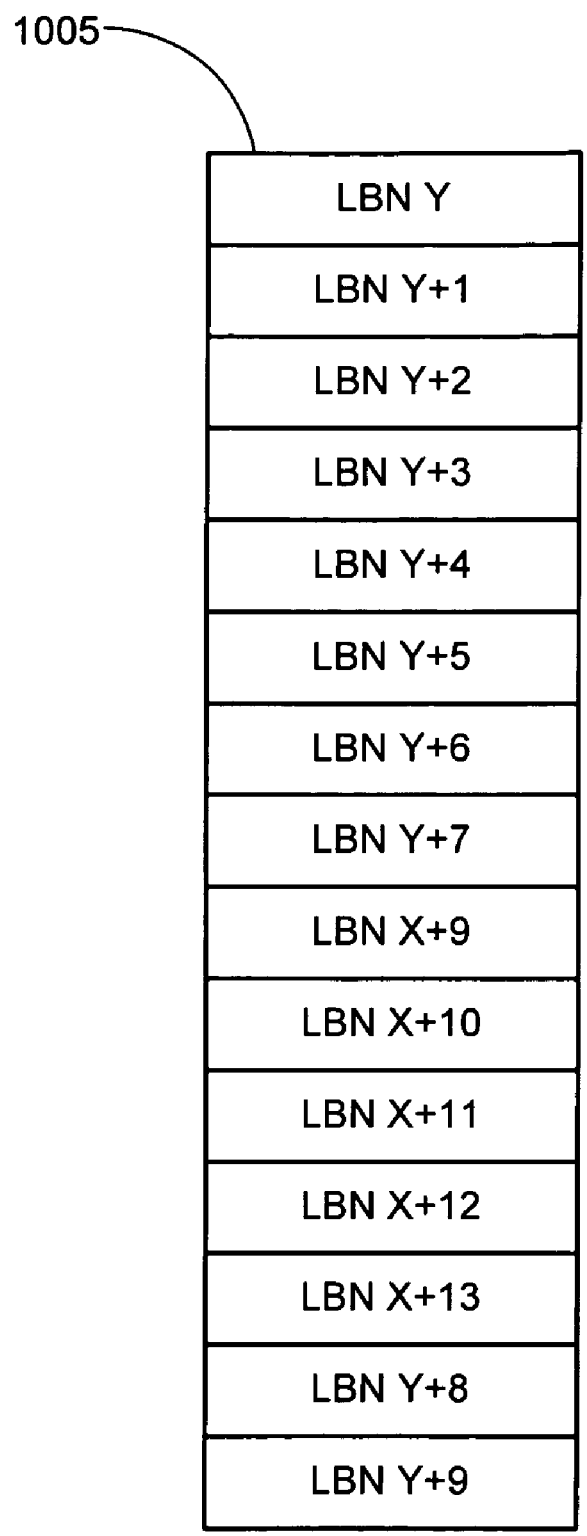
FIG. 10 shows a conceptual diagram of an inode associated with file Y.

FIG. 10 shows a conceptual diagram of an inode 1005 associated with file Y that stores the LBNs of each block of file Y (in accordance with FIG. 9). The LBNs of the blocks of file Y are stored in the inode 1005 in the particular order needed to properly read the blocks of file Y. When a later read request is received for file Y, the storage operating system 300 would retrieve the associated inode 1005 and retrieve the blocks at the LBNs stored in the associated inode 1005, the blocks being retrieved in the particular order specified in the associated inode 1005.

In the example of FIG. 9, when a read request for file Y is later received, the read request is performed according to the associated inode 1005 of file Y. As such, the read/write head of the disk device would perform the read operation as follows: perform a sequential read 960 on blocks having LBNs (Y) through LBN (Y+7) on the first track 950, perform a seek 970 to the second track 910, perform a sequential read 960 on blocks having LBNs (X+9) through LBN (X+13) on the second track 910, perform a seek 970 to the first track 950, and perform a sequential read 960 on blocks having LBNs (Y+8) through LBN (Y+9) on the first track 950.

The above example illustrates how read latency of the received blocks of file Y may be mitigated since there are fewer seek operations during the read of file Y. For example, the single-block match of block 760 of file Y and block 720 of file X was not deduplicated, thus avoiding, during a later read operation, a seek to the second track 910 just to read the single block 720 of file X. For example, when a seek to the second track 910 is performed, the seek is performed to retrieve a sequence of THN (e.g., 5) or more blocks on the second track 910. Thus, the time cost of the seek is spread over the THN or more blocks (in this example, the time cost is spread over 5 blocks), rather than just a single block.

III. Block-Comparison and Mapping Mechanisms

A. Introduction

In some embodiments, the deduplication layer 275 performs deduplication based on a threshold number of sequential blocks using a block-comparison mechanism and a mapping mechanism. The deduplication layer 275 receives a series of blocks for processing to determine whether any of the received blocks may be deduplicated. The received blocks may be contained in a file (for file-based access) or not contained in a file (for block-based access). The received blocks may have not yet been written to a disk device (in online processing), whereby any received blocks that are found to be redundant and deduplicated are not subsequently written to a disk device. The received blocks may have already been written to a disk device (in offline processing), whereby any received blocks that are found to be redundant and deduplicated may be deleted from the disk device.

The deduplication layer 275 determines whether a series of THN or more of the received blocks (THN series) match a sequence of THN or more currently stored blocks (THN sequence) by querying the block-comparison mechanism. The number of blocks in the THN series may be equal to the number of blocks in the matching THN sequence. In some embodiments, the block-comparison mechanism comprises the metadata structure 290 which contains metadata entries of currently stored blocks. The deduplication layer 275 also processes the received blocks to create new metadata entries for the received blocks in the metadata structure 290. In some embodiments, the metadata structure 290 is resident in memory 240 or NVRAM 245, and/or stored on a storage device 125.

Based on the results of the query to the block-comparison mechanism, a THN series of blocks may be deduplicated. If so, the deduplication layer 275 produces indexes to the THN sequence of matching stored blocks in the mapping mechanism which is used to record mappings of deduplicated blocks to their corresponding matching stored blocks. The mapping mechanism may be used by the storage operating system 300 to perform later read requests received for the received blocks. In some embodiments, for file-based access, the mapping mechanism comprises the set of inodes associated with the files of the storage system 120. In some embodiments, for block-based access, the mapping mechanism comprises the metadata structure 290 which contains mapping entries of deduplicated blocks.

As such, the deduplication layer 275 uses the block-comparison mechanism for performing two general functions in relation to a received series of blocks. Function 1 (the comparison function) is to determine whether a series of THN or more of the received blocks (THN series) match a sequence of THN or more currently stored blocks (THN sequence), whereby the THN series may then be deduplicated. Note that in the comparison function, although the THN series of received blocks have assigned LBNs, the BSNs (rather than the assigned LBNs) of the received blocks are used in the comparison function. Function 2 (the entry function) is to process the received series of blocks to produce new metadata entries in the block-comparison mechanism for possible use in deduplicating subsequently received series of blocks. In the entry function, the assigned LBNs of the received blocks are used since the entries in the block-comparison mechanism are based on a sequence of blocks (which is indicated by the LBNs of the blocks).

B. Metadata Structure

Figure 11:
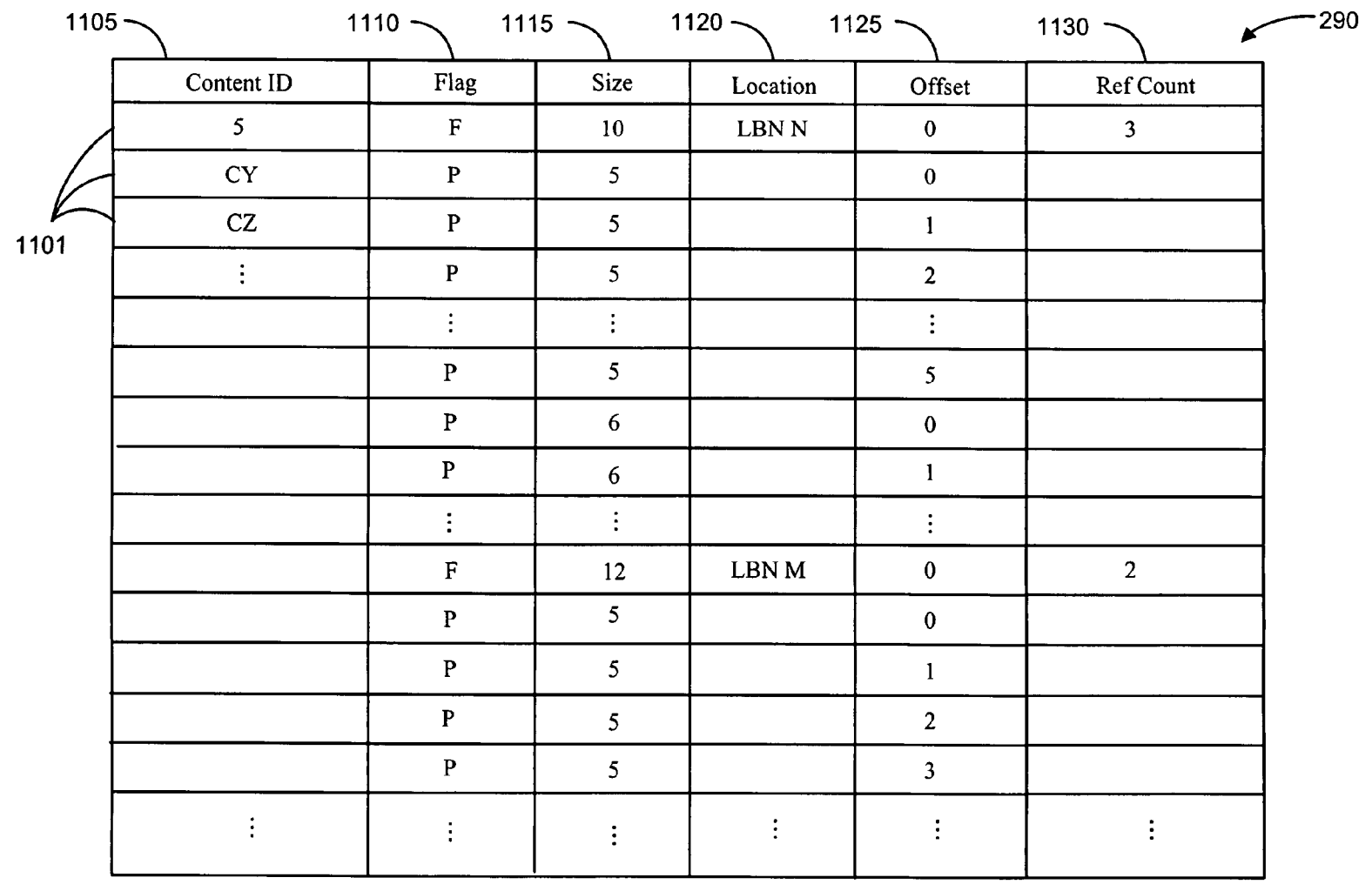

FIG. 11 shows a conceptual diagram of an exemplary block-comparison mechanism comprising a metadata structure 290. The metadata structure 290 contains metadata for THN sequences, whereby the THN sequences are currently stored on a storage device 125 or are awaiting to be stored on a storage device 125 (and have assigned LBNs). In the example of FIG. 11, the metadata structure 290 comprises a plurality of metadata entries 1101, one metadata entry for each THN sequence. The metadata structure 290 may implement an indexing system to organize the metadata entries 1101 to provide efficient entry lookups in the metadata structure 290. For example, the entries 1101 may be indexed using checksum or hashing algorithms (discussed below).

In some embodiments, an entry 1101 may comprise a "full entry" or a "partial entry." A full entry may represent and contain metadata for a "full THN sequence" comprising a longest sequence of blocks. A partial entry may represent and contain metadata for a "partial THN sequence" comprising a subset of blocks of a full THN sequence (while still having a sequence of THN or more blocks). A set of zero or more partial THN sequences may be derived from an associated full THN sequence. For example, if THN equals 5 and if a full THN sequence comprises 10 sequential blocks, a partial THN sequence may comprise 5, 6, 7, 8, or 9 sequential blocks derived from within the 10 sequential blocks.

A partial THN sequence need not begin at the beginning block of the full THN sequence. Rather the beginning of the partial THN sequence may be offset by 0 or more blocks from the beginning block of the full THN sequence, so that partial THN sequences having the same block size may be derived from several different block ranges within the full THN sequence (where each derived partial THN sequence has a different combination of block size and offset from the beginning of the full THN sequence.).

Figure 12:
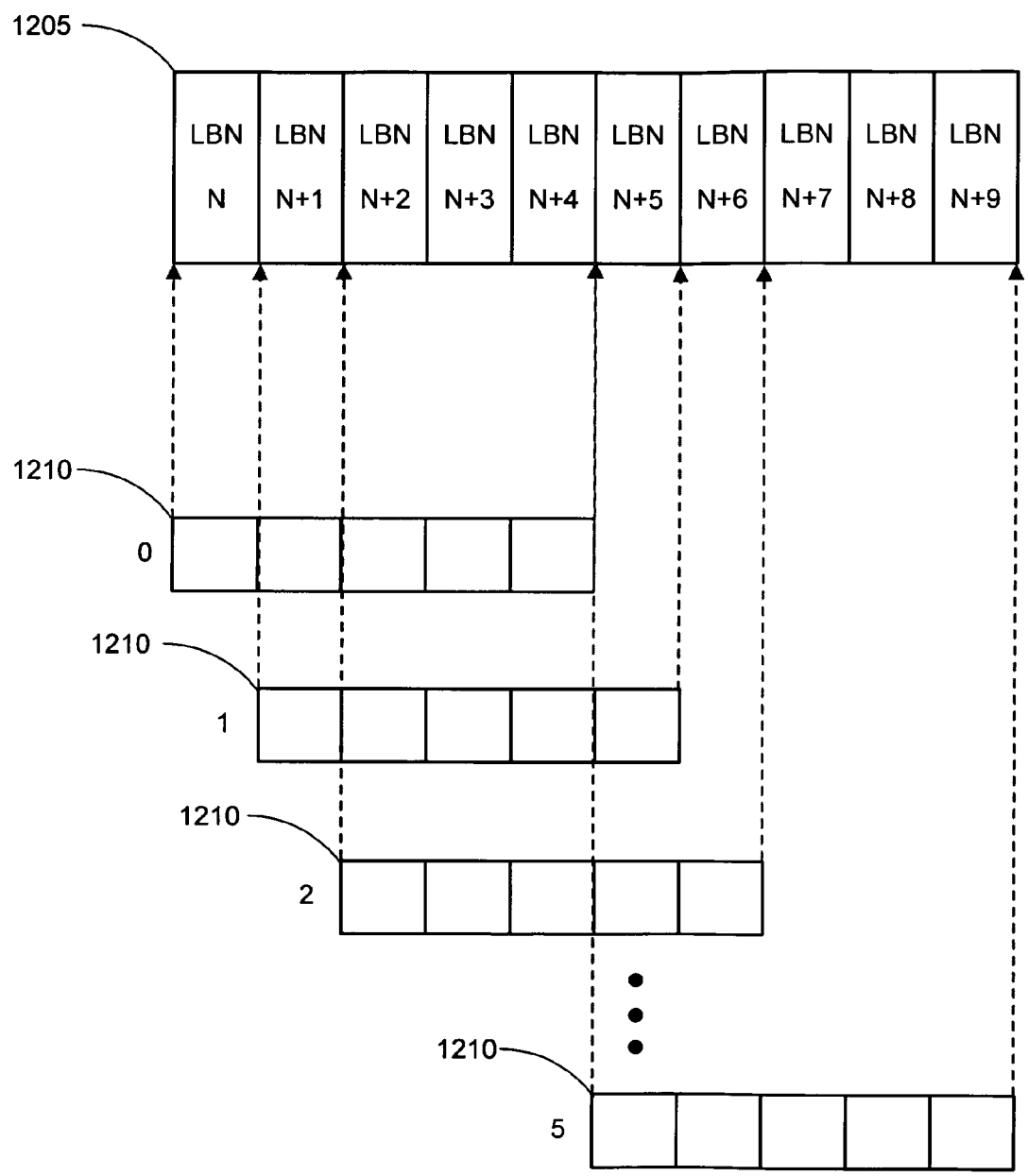
FIG. 12 shows a conceptual example of how various partial sequences are derived from a full sequence.

FIG. 12 shows a conceptual example of how various partial THN sequences 1210 may be derived from a full THN sequence 1205 comprising 10 blocks (comprising LBNs N through N+9) when the value of THN equals 5. As shown in the example of FIG. 12, a partial THN sequence 1210 may begin at the beginning block of the full THN sequence 1205 (thus having an offset of 0), or may be offset by 1 or more blocks from the beginning block of the full THN sequence 1205. As such, where each partial THN sequence 1210 comprises 5 blocks, 6 partial THN sequences 1210 (having offsets 0 through 5) may be derived from a full THN sequence 1205 having 10 blocks. In a similar manner, where each partial THN sequence 1210 comprises 6 blocks, 5 partial THN sequences 1210 may be derived; where each partial THN sequence 1210 comprises 7 blocks, 4 partial THN sequences 1210 may be derived, and so forth. As such, when THN equals 5, a total of 21 different partial THN sequences 1210 may be derived from a full THN sequence 1205 having 10 blocks (each derived partial THN sequence having a different combination of block size and offset value). Each derived partial THN sequence may have a corresponding partial entry in the metadata structure 290.

In some embodiments, a metadata entry 1101 may comprise fields for a content identifier 1105, an entry flag 1110, a sequence size 1115, an address location 1120, an offset value 1125, a reference count 1130, or any combination of these. In some embodiments, the metadata structure 290 may comprise different metadata fields for full and partial entries. The metadata structure 290 contains an entry 1101 for each full and partial THN sequence.

The content identifier 1105 represents the data contents of the blocks of the corresponding THN sequence and is produced using a content identifier operation/algorithm on the data contents of the blocks. The content identifier 1105 may be used as an index for the corresponding entry. The type of content identifier 1105 used may be such that two sets of blocks having the same content identifier have a high probability of also having the same data content.

In some embodiments, the content identifier of a sequence of blocks is determined using a checksum operation/algorithm that produces a checksum value representing the data contents of the sequence of blocks, the checksum value comprising the content identifier. For example, the checksum value may comprise a 128 or 256 bit number that represents the data contents of the sequence of blocks. As known in the art, when two sets of blocks have the same checksum value, there is a high probability that the two sets of blocks have the same data content, whereby only in rare instances is this not true. In other embodiments, the content identifier is determined by applying a hashing operation/algorithm to the checksum value that produces a hash value representing the data contents of the sequence of blocks, the hash value comprising the content identifier. In further embodiments, the content identifier is determined using other operations/algorithms.

In some embodiments, a content identifier operation is applied separately to each block of a sequence to produce a single content identifier for each block. The single content identifiers may then be concatenated (whereby the single content identifiers are joined/appended end to end) to create an aggregate content identifier (comprising a superset of all the single content identifiers) that comprises the content identifier for the sequence of blocks. For example, a checksum operation may be applied separately to each block of a sequence to produce a single checksum for each block. The set of single checksums may then be concatenated to create an aggregate checksum that represents the contents of the sequence of blocks. In other embodiments, a hashing operation may then be applied to the aggregate checksum to produce a hashing value that comprises the content identifier for the sequence of blocks.

The entry flag 1110 indicates whether the entry is a full or partial entry. The sequence size 1115 indicates the size of the corresponding THN sequence (e.g., in terms of block size). The address location 1120 indicates the starting location where the corresponding THN sequence is stored on a storage device 125. For example, for file-based access, the address location 1120 may comprise a file identifier and the LBN of the first block of the THN sequence. For block-based access, the address location 1120 may comprise the LBN of the first block of the THN sequence. The address location range (e.g., LBN range) of the THN sequence may then be determined from the address location 1120 and the sequence size 1115.

In some embodiments, a full entry has an address location 1120 field. Partial entries may contain an offset value 1125 that indicates the offset of the first block of the corresponding partial THN sequence in relation to first block of the associated full THN sequence (from which the partial THN sequence was derived). The address location (e.g., LBN) of the first block of the partial THN sequence may then be determined from the address location 1120 of the associated full THN sequence and the offset value 1125. The address location range (e.g., LBN range) of the partial THN sequence may then also be determined from the address location of the first block of the partial THN sequence and the sequence size 1115.

For full entries, the reference count 1130 may indicate how many files or set of blocks index the corresponding full THN sequence. The reference count 1130 indicates how many sets of blocks have been deduplicated using the corresponding full THN sequence and were replaced by an index to the corresponding full THN sequence.

C. Comparison Function of the Block-Comparison Mechanism

In some embodiments, when the deduplication layer 275 receives a series of blocks for processing, the deduplication layer 275 may first perform a comparison function using the metadata structure 290 to determine whether any of the received blocks may be deduplicated. If the received series of blocks is less than THN blocks, the processing of the received blocks ends. If not, from the received series of blocks, the deduplication layer 275 may derive a set of THN series, each THN series comprising THN or more blocks. The deduplication layer 275 may do so using methods similar to deriving partial THN sequences from full THN sequences described above, except that the set of THN series will also include the complete received series of blocks. For example, if THN equals 5, for a received series of 10 blocks, 22 THN series may be derived, the first THN series comprising the received series of 10 blocks.

The deduplication layer 275 may begin by first processing the complete received series of blocks to attempt to deduplicate that largest number of blocks. If the complete received series of blocks is not deduplicated by the deduplication layer 275, the next largest sized set of THN series is then processed for deduplication, and so forth to the smallest sized set of THN series. For example, the complete received series of 10 blocks may be processed first, then the set of THN series having 9 blocks is processed, and so forth until the set of THN series having 5 blocks is processed. As the deduplication layer 275 processes the set of THN series, any blocks that are deduplicated are no longer candidates for deduplication. As such, any THN series containing a deduplicated block may be removed from the set of THN series for processing. For example, if the complete received series of 10 blocks is deduplicated, processing ends since the each of the remaining THN series would contain one of the 10 deduplicated blocks.

The deduplication layer 275 may process each THN series in the set of derived THN series by determining a content identifier for the THN series that represents the data contents of the THN series. The content identifier for the THN series may be produced using the steps used to produce the content identifiers 1105 in the metadata structure 290. For example, the content identifier of the THN series may be determined by applying a checksum operation to each block of the series to produce a single checksum for each block, concatenating the single checksums to create an aggregate checksum, and applying a hashing operation to the aggregate checksum to produce a hashing value that comprises the content identifier for the series of blocks.

The deduplication layer 275 then queries the metadata structure 290 using the content identifier for the THN series. If a matching content identifier 1105 is found in the metadata structure 290, this indicates a matching entry 1101 has been found that represents a matching THN sequence. The number of blocks in the THN series may be equal to the number of blocks in the matching THN sequence. As discussed above, the type of content identifier is used such that two sets of blocks having the same content identifier have a high probability of also having the same data content (for example, when using a checksum or hash value). As such, there is a high probability that the THN sequence represented by the matching entry has the same data content as the THN series. As an optional step, the deduplication layer 275 may confirm this is true by comparing the contents of the THN series with the matching THN sequence.

In some embodiments, when a matching content identifier 1105 is found in the metadata structure 290, the metadata structure 290 responds to the query from the deduplication layer 275 by retrieving and returning one or more field values from the matching entry. For example, the returned values may include the sequence size 1115, the address location 1120, and/or the offset value 1125. In other embodiments, the deduplication layer 275 may retrieve the one or more field values from the matching entry.

If a matching THN sequence is found, the THN series may be considered redundant and deduplicated using the one or more returned values. In offline processing (where the THN series may have already been written to a disk device), deduplication of the redundant THN series may comprise deleting the data blocks of the THN series from the disk device. In online processing (where the THN series have not yet been written to a disk device), deduplication of the redundant THN series may comprise not subsequently storing the THN series to a disk device. Rather than storing the redundant THN series on the disk device, the deduplication layer 275 produces indexes in the mapping mechanism to the matching THN sequence in place of the redundant THN series. The indexes may comprise, for example, the address locations on a disk device of the matching THN sequence.

The above comparison processing steps are performed for each THN series in the set of derived THN series. After processing of all derived THN series, any blocks of the THN series that are not considered redundant and deduplicated are non-redundant blocks that are to be stored to a storage device 125. The non-redundant blocks are then processed according to the entry function of the deduplication layer 275.

D. Entry Function of the Block-Comparison Mechanism

As described above, when a THN series match a THN sequence, the blocks in the THN series may be deduplicated. Other received blocks that are not deduplicated are referred to as non-deduplicated blocks. The entry function of the deduplication layer 275 processes the non-deduplicated blocks to produce new entries 1101 in the block-comparison mechanism (e.g., metadata structure 290) for possible use in deduplicating subsequently received blocks. The non-deduplicated blocks have address locations (e.g., LBNs) assigned by the file system layer 350 indicating where the non-deduplicated blocks are to be stored on a storage device 125. As such, the LBNs of the non-deduplicated blocks may be used to determine if the non-deduplicated blocks contain any THN sequences (i.e., sequences of THN or more blocks having sequential LBNs) that are to be stored on a same track of a disk device.

The deduplication layer 275 begins by determining the longest THN sequences (referred to as full THN sequences) within the set of non-deduplicated blocks. A set of non-deduplicated blocks may have one or more full THN sequences. The deduplication layer 275 produces a content identifier for each full THN sequence. For example, a checksum operation may be applied separately to each block of the full THN sequence to produce a single checksum for each block. The single checksum may then be concatenated to create an aggregate checksum that comprises the content identifier for the full THN sequence. In other embodiments, a hashing operation may be applied to the aggregate checksum to produce a hashing value that comprises the content identifier for the full THN sequence. The deduplication layer 275 produces a full entry for the full THN sequence using the produced content identifier as an index to store the full entry in the metadata structure 290.

For each full THN sequence, the deduplication layer 275 also derives one or more partial THN sequences (as discussed above in relation to FIG. 12) and produces a content identifier for each partial THN sequence. For example, the deduplication layer 275 may use the single checksums already produced for the individual blocks of the full THN and retrieve and concatenate the single checksums of the blocks corresponding to the partial THN sequence to produce an aggregate checksum. The hashing operation may be applied to the aggregate checksum to produce a hashing value that comprises the content identifier for the partial THN sequence. The deduplication layer 275 produces a partial entry for each partial THN sequence using the produced content identifier as an index to store the partial entry in the metadata structure 290. The deduplication layer 275 enters particular metadata for each full or partial entry (as discussed above in relation to FIG. 11). The deduplication layer 275 may repeat the process for each full THN sequence.

E. Mapping Mechanism

When the deduplication layer 275 deduplicates a redundant THN series, it produces indexes in the mapping mechanism to the matching THN sequence in place of the redundant THN series. The indexes may comprise, for example, the address locations (e.g. LBNs) on a disk device of the matching THN sequence. As such, the mapping mechanism is used to record mappings of deduplicated redundant blocks to their corresponding matching stored blocks. The mapping mechanism may be used by the storage operating system 300 to perform later read requests received for deduplicated redundant blocks.

In some embodiments, for file-based access (using, for example, CIFS or NFS protocols), the mapping mechanism comprises the set of inodes associated with the files of the storage system 120, the inodes being maintained by the file system layer 350. In these embodiments, when blocks of a file are deduplicated, the deduplication layer 275 produces indexes (LBNs) to the matching blocks in the inode of the file (as discussed above in relation to FIG. 10). In other embodiments, the deduplication layer 275 may send a request to the file system layer 350 that maintains the inodes to produce the appropriate indexes in the appropriate inode. Later read requests received for a file having deduplicated redundant blocks may then be performed by the storage operating system 300 by using the inode for the file and the LBNs contained in the inode (as per usual).

Figure 13:
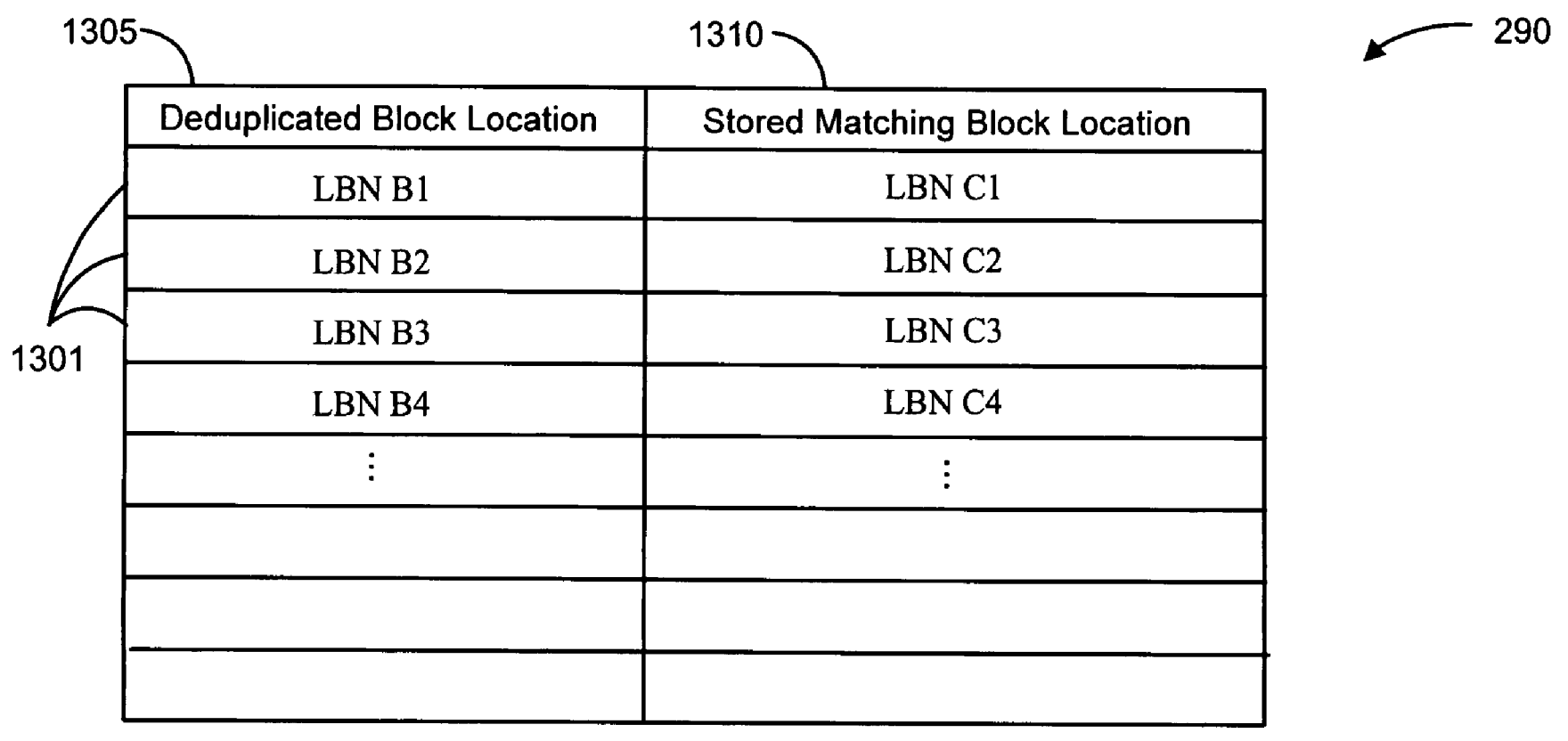

In some embodiments, for block-based access (for example, in SAN or iSCSI access), the mapping mechanism comprises the metadata structure 290 which further contains mapping entries of deduplicated blocks. In other embodiments, the mapping mechanism comprises a data structure that is separate from the metadata structure 290. FIG. 13 shows a conceptual diagram of an exemplary mapping mechanism comprising a metadata structure 290. In these embodiments, in addition to the plurality of metadata entries 1101, the metadata structure 290 further comprises a plurality of mapping entries 1301, one mapping entry 1301 for each block of a deduplicated THN series. A mapping entry 1301 may comprise an assigned location 1305 for a deduplicated block and an index 1310 (e.g., stored location) to a corresponding matching stored block. Note that the blocks of a deduplicated THN series will have address locations (e.g., LBNs) assigned by the file system layer 350. For example, a mapping entry 1301 may comprise the assigned LBN for a deduplicated block and an LBN for the corresponding matching stored block.

Later read requests received for deduplicated blocks may then be performed by the storage operating system 300 by using the metadata structure 290. Each read request will specify address locations (e.g., LBNs) of deduplicated blocks to be read. The metadata structure 290 may then be used to map the LBNs of the deduplicated blocks (received in the read request) to LBNs of the corresponding matching blocks (whereby the data of the corresponding matching blocks are retrieved using the LBNs).

F. De-Staging Layer

In some embodiments, the deduplication layer 275 may be used in conjunction with a de-staging layer 375. In these embodiments, the deduplication layer 275 may process the write logs accumulated during a first stage that are awaiting the next consistency point to be written to a storage device 125. During this time, the deduplication layer 275 may process the blocks in the accumulated write logs for possible deduplication before the blocks are written to the storage devices 125. When the deduplication layer 275 is used with a de-staging layer 375, additional steps may be used when deduplicating blocks.

As discussed above, a write log for a write request for a file produced in the first stage may comprise data of the blocks to be written, the locations (LBNs) of where the blocks are to be written, and an assigned inode number. When a write log for a write request for a file is produced in the first stage, the file system layer 350 may also store LBNs for each block of the file in its assigned inode.

As such, when redundant blocks are deduplicated according to the embodiments herein, the write logs containing the deduplicated blocks may be modified to reflect the deduplication. For example, modifications to a write log containing deduplicated blocks may include deleting the deduplicated blocks from the write log and removing the address locations (e.g., LBNs) of the deduplicated blocks from the write log. These additional steps may be performed since the deduplicated blocks should not be written to the storage devices 125. As such, when the write log is later sent to the storage layer 380, the write log only contains non-deduplicated blocks which are written to a storage device 125 in the second stage.

G. Threshold Number

As described above, in some embodiments, deduplication of received blocks is performed based on a threshold number (THN) of sequential blocks, the threshold number being two or greater. The threshold number may be determined in different ways. For example, workloads and file system implementations define the ways in which data is laid out on a disk device. Analysis of the disk layout may be made for a different workload types from the perspective of duplication. As a result, a reasonable value for the threshold number may be determined by observing the lengths of block series that are duplicated. As another example, using a threshold number of blocks in deduplication may amortize the time cost of a disk seek over a larger number of sequential reads. In the absence of deduplication, the average number of sequential block reads that happen after a disk seek to a new track may be computed. In some embodiments, the threshold number may be based on this average number.

In some embodiments, the deduplication layer 275 comprises a parameter interface 280 (as shown in FIG. 2) that receives the threshold number as a parameter to dynamically change the threshold number. In some embodiments, the parameter is received from a user through the parameter interface 280 which comprises a user interface (such as, a graphical user interface or command line interface). In other embodiments, the parameter may be received from a program through the parameter interface 280 which comprises a program interface, such as, an application program interface (API). The received parameter may dynamically change the threshold number used by the deduplication layer 275 without requiring the software code of the deduplication layer 275 to be modified.

Referring back to FIG. 1, in some embodiments, a server system 110 may simultaneously execute two or more applications 115 that submit read/write requests for reading/writing data on the storage devices 125 of the storage system 120. In these embodiments, the storage system 120 may receive access (read/write) requests from two or more applications 115 (executing on one or more server systems 110) simultaneously. The two or more applications 115 may be accessing different sets of storage devices 125 or volumes of the storage system 120. In some embodiments, the deduplication layer 275 may implement different threshold numbers based on the applications that send the write requests (comprising a set of received blocks). In these embodiments, the deduplication layer 275 may determine which application sent the set of blocks and use a threshold number value based on the application. In these embodiments, the deduplication layer 275 may use a first threshold number for a first application (when receiving and processing sets of blocks to be written from the first application) and use a second threshold number for a second application (when receiving and processing sets of blocks to be written from the second application), the first and second threshold numbers being different in value.

IV. Methods for Deduplication

Figure 14A:
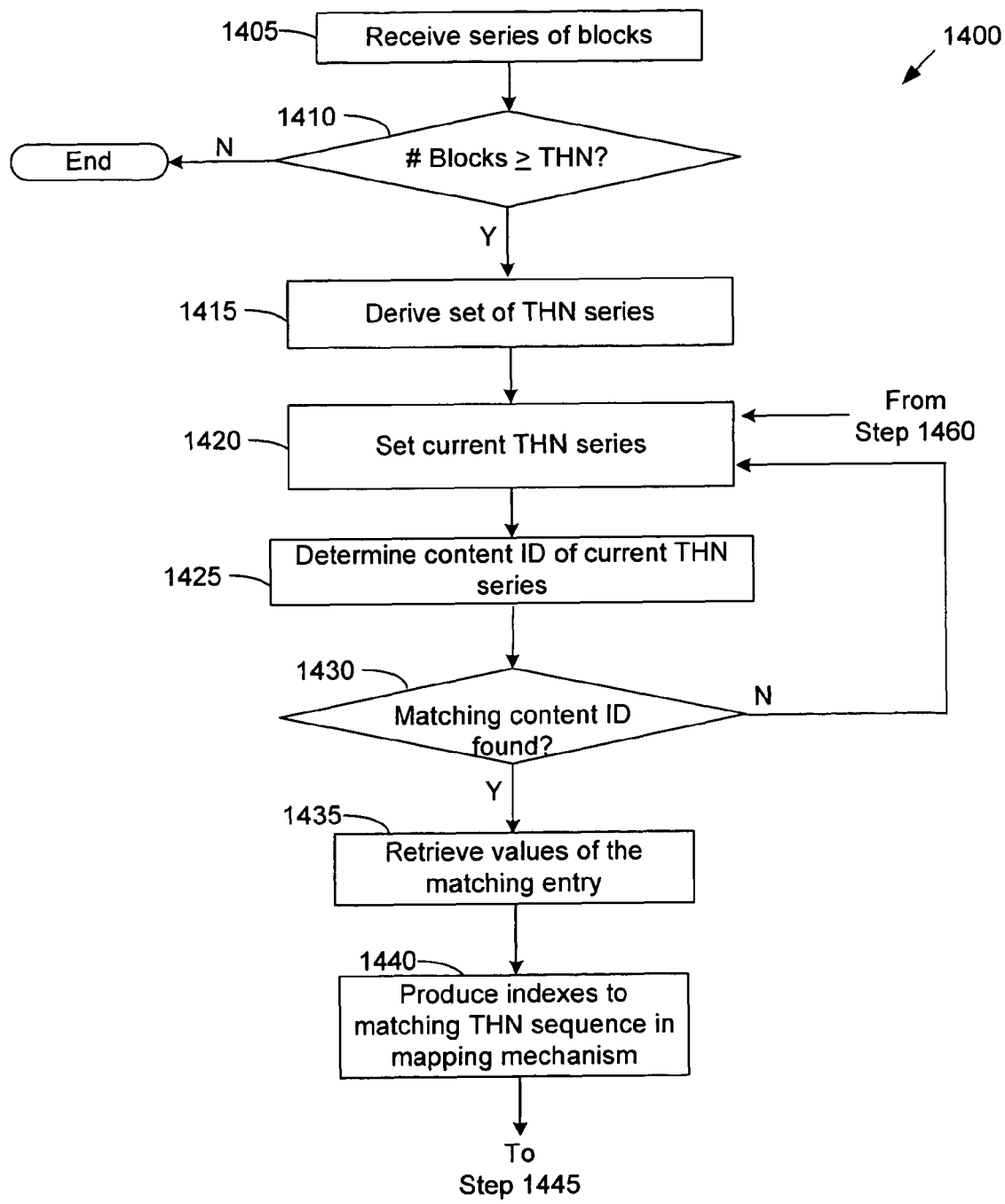
FIGS. 14A-B are flowcharts of a method for deduplication of data on a disk device based on a threshold number of sequential blocks.
Figure 14B:
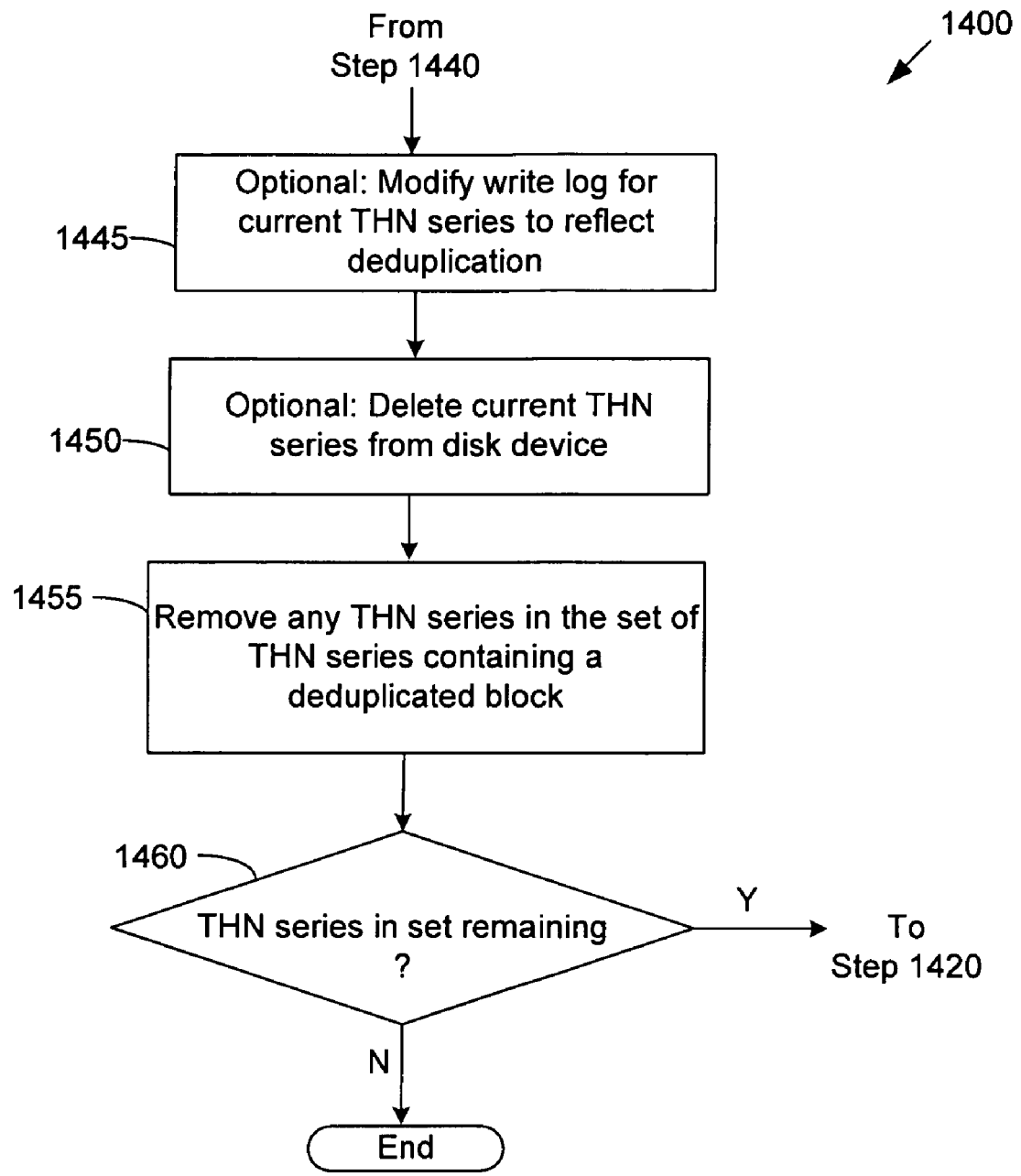

FIGS. 14A-B are flowcharts of a method 1400 for deduplication of data on a disk device based on a threshold number of sequential blocks. In some embodiments, some of the steps of the method 1400 are implemented by software or hardware. In some embodiments, some of the steps of method 1400 are performed by the deduplication layer 275 of the storage operating system 300 and comprise the comparison function of the deduplication layer. The order and number of steps of the method 1400 are for illustrative purposes only and, in other embodiments, a different order and/or number of steps are used.

The method 1400 begins when the deduplication layer 275 receives (at 1405) a series of blocks for processing to determine whether any of the received blocks may be deduplicated. The received blocks may be contained in a file (for file-based requests) or not contained in a file (for block-based requests). The deduplication layer 275 then determines (at 1410) whether the received series of blocks has THN or more blocks. If not, the method 1400 ends. If so, the deduplication layer 275 derives (at 1415) a set of one or more THN series, each THN series comprising THN or more blocks. For example, if THN equals 5, for a received series of 10 blocks, 22 THN series may be derived, the first THN series comprising the received series of 10 blocks.

A THN series in the set of derived THN series is set (at 1420) as a current THN series. In some embodiments, the first THN series for processing may comprise the complete received series of blocks to attempt to deduplicate that largest number of blocks first. For example, the complete received series of 10 blocks may be processed first, then the set of THN series having 9 blocks is processed, and so forth until the set of THN series having 5 blocks is processed.

The deduplication layer 275 then determines (at 1425) a content identifier (e.g., checksum or hash value) for the current THN series that represents the data contents of the current THN series. The deduplication layer 275 then determines (at 1430) whether the content identifier for the current THN series matches any content identifiers 1105 in the metadata structure 290. If a matching content identifier 1105 is not found, the method 1400 continues at step 1420 where a next THN series in the set of derived THN series is set as the current THN series.

If a matching content identifier 1105 is found in the metadata structure 290, this indicates a matching entry 1101 has been found that represents a matching THN sequence. As such, a matching THN sequence has been found to exist and the current THN series may be deduplicated. To do so, one or more field values from the matching entry are retrieved (at 1435) from the metadata structure 290. In some embodiments, the retrieved values may include the sequence size 1115, the address location 1120, and/or the offset value 1125 of the matching THN sequence. Since a matching THN sequence is found, the current THN series may be considered redundant and deduplicated using the one or more returned values.

To deduplicate the current THN series, the deduplication layer 275 produces (at 1440) indexes (e.g., address locations on a disk device) in the mapping mechanism to the matching THN sequence. In some embodiments, for file-based access, the deduplication layer 275 produces the indexes in the inode of the file containing the current THN series. In some embodiments, for block-based access, the deduplication layer 275 produces the indexes by producing new mapping entries 1301 in the metadata structure 290 containing the indexes.

As an optional step, if a de-staging layer 375 is implemented in the storage operating system 300, the write log containing the current THN series is modified (at 1445) to reflect the deduplication of the current THN series. For example, the modifications to the write log may include deleting the data content and the LBNs of the blocks of the current THN series from the write log. As an optional step, in offline processing (where the current THN series may have already been written to a disk device), the method 1400 deletes (at 1450) the blocks of the current THN series from the disk device. In online processing (where the THN series have not yet been written to a disk device), the blocks of the current THN series are not subsequently stored to a disk device.

If the current THN series is deduplicated, any deduplicated blocks of the current THN series are no longer candidates for deduplication. As such, any THN series in the set of derived THN series containing a deduplicated blocks are removed (at 1455) from the set of derived THN series for processing. The method then determines (at 1460) if any THN series remain in the set of derived THN series for processing. If so, the method continues at step 1420 where a next THN series in the set of derived THN series is set as the current THN series. If not, the method ends.

The above method 1400 is performed for each THN series in the set of derived THN series. After processing of all derived THN series, any blocks of the received series that are not deduplicated are non-deduplicated blocks that are to be stored to a storage device 125. The non-deduplicated blocks are then processed according to the entry function of the deduplication layer 275 to create metadata entries for a set of zero or more THN sequences of non-deduplicated blocks.

Figure 15:
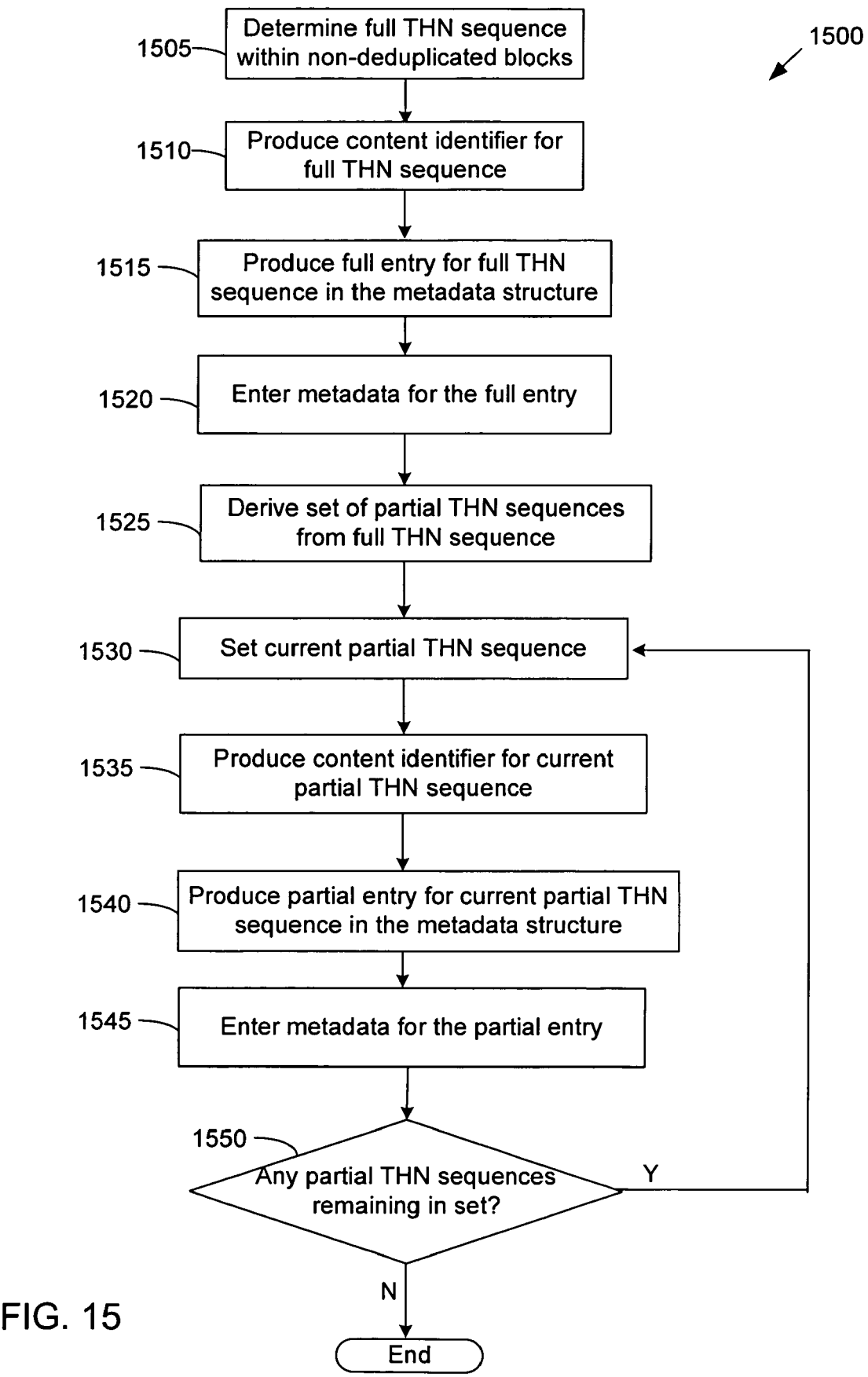
FIG. 15 is a flowchart of a method for processing to produce new metadata entries in the block-comparison mechanism.

FIG. 15 is a flowchart of a method 1500 for processing the non-deduplicated blocks to produce new metadata entries 1101 in the block-comparison mechanism (e.g., metadata structure 290) for possible use in deduplicating subsequently received blocks. In some embodiments, some of the steps of the method 1500 are implemented by software or hardware. In some embodiments, some of the steps of method 1500 are performed by the deduplication layer 275 of the storage operating system 300 and comprise the entry function of the deduplication layer. The order and number of steps of the method 1500 are for illustrative purposes only and, in other embodiments, a different order and/or number of steps are used.

Note that the non-deduplicated blocks have address locations (e.g., LBNs) assigned by the file system layer 350 indicating where the non-deduplicated blocks are to be stored on a storage device 125. As such, the address locations of the non-deduplicated blocks may be used to determine if the non-deduplicated blocks contain any THN sequences comprising sequences of THN or more blocks having assigned consecutive address locations (e.g., LBNs) that are to be stored on a same track of a disk device.

The method 1500 begins by determining (at 1505) a full THN sequence within the set of non-deduplicated blocks. The deduplication layer 275 produces (at 1510) a content identifier (e.g., checksum or hash value) for the full THN sequence. The deduplication layer 275 then produces (at 1515) a full entry for the full THN sequence using the produced content identifier as an index to store the full entry in the metadata structure 290. The deduplication layer 275 then enters (at 1520) particular metadata for the full entry 1101. For example, the full entry 1101 may comprise the content identifier 1105, an entry flag 1110, a sequence size 1115, an address location 1120, and/or a reference count 1130.

The deduplication layer 275 then derives (at 1525) a set of zero or more partial THN sequences from the full THN sequence. A partial THN sequence in the set of partial THN sequences is set (at 1530) as a current partial THN sequence. The deduplication layer 275 produces (at 1535) a content identifier (e.g., checksum or hash value) for the current partial THN sequence. The deduplication layer 275 then produces (at 1540) a partial entry for the current partial THN sequence using the produced content identifier as an index to store the partial entry in the metadata structure 290. The deduplication layer 275 then enters (at 1545) particular metadata for the partial entry 1101. For example, the partial entry 1101 may comprise the content identifier 1105, an entry flag 1110, a sequence size 1115, and/or an offset value 1125.

The method then determines (at 1550) if any partial THN sequences remain in the set of partial THN sequences for processing. If so, the method continues at step 1530 where a next partial THN sequence in the set of partial THN sequences is set as the current partial THN sequence. If not, the method ends. The above method 1500 may be performed for each full THN sequence within the set of non-deduplicated blocks.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A storage system for deduplicating blocks of data based on a predetermined threshold number (THN) of sequential blocks, the storage system comprising:
   a processor;
   a set of one or more disk devices for storing a plurality of blocks, each disk device comprising a set of tracks for storing blocks; and
   a deduplication layer configured for performing deduplication processing on received blocks by:
      receiving a set of blocks;
      determining whether the set of received blocks comprises THN or more blocks;
      upon determining that the set of received blocks does not comprise THN or more blocks, stopping deduplication processing on the set of received blocks;
      upon determining that the set of received blocks comprises THN or more blocks, determining whether a series of THN or more received blocks (THN series) matches, in data content, a sequence of THN or more blocks stored on a disk device (THN sequence), a THN sequence comprising THN or more consecutive blocks stored on a same track of a disk device, THN having a value of 2 or greater; and
      upon determining that a matching THN sequence is found, deduplicating the blocks of the THN series using the matching THN sequence.

2. The storage system of claim 1, wherein a THN series matches a THN sequence when the blocks of the THN series have the same data content as or have a high probability of having the same content as the blocks of the THN sequence.

3. The storage system of claim 1, further comprising:
   comparison mechanism for storing metadata entries for a plurality of THN sequences, each metadata entry comprising metadata for a THN sequence and being indexed in the comparison mechanism by a content identifier that represents the data contents of the blocks of the THN sequence, wherein the deduplication layer is configured for determining whether a THN series matches a THN sequence using the comparison mechanism.

4. The storage system of claim 3, wherein the comparison mechanism stores metadata entries for full or partial THN sequences, a partial THN sequence comprising a subset of THN or more blocks of a full THN sequence, a set of zero or more partial THN sequences being derived from each full THN sequence, each partial THN sequence in the set having a different combination of block size and offset from the beginning of the full THN sequence.

5. The storage system of claim 1, further comprising:
   a mapping mechanism for storing mappings of deduplicated blocks of the THN series to blocks of the matching THN sequence, wherein the deduplication layer is configured for deduplicating the blocks of the THN series by creating indexes to the blocks of the matching THN sequence in the mapping mechanism.

6. The storage system of claim 3, wherein:
   a set of non-deduplicated blocks comprises received blocks that are not deduplicated, each non-deduplicated block having an assigned address location indicating a location on a disk device for storage;
   the deduplication layer is further configured for:

determining a set of zero or more THN sequences of non-deduplicated blocks, a THN sequence of non-deduplicated blocks comprising THN or more non-deduplicated blocks having consecutive assigned address locations; and for each THN sequence of non-deduplicated blocks, producing a metadata entry in the comparison mechanism.

7. The storage system of claim 1, wherein:

the set of received blocks is received from a first application or a second application;

the deduplication layer is further configured for:

using a first threshold number for the set of received blocks received from the first application and a second threshold number for the set of received blocks received from the second application, the first and second threshold numbers being different in value.

8. A storage system for deduplicating blocks of data for storage based on a predetermined threshold number (THN) of blocks, the storage system comprising:

a processor;

a set of one or more disk devices for storing a plurality of blocks, each block having an address location; and a deduplication layer configured for performing deduplication processing on received blocks by:

receiving a set of blocks;

determining whether the set of received blocks comprises THN or more blocks;

upon determining that the set of received blocks does not comprise THN or more blocks, stopping deduplication processing on the set of received blocks;

upon determining that the set of received blocks comprises THN or more blocks, determining whether a series of THN or more received blocks (THN series) matches, in data content, a sequence of THN or more blocks stored on a disk device (THN sequence), a THN sequence comprising THN or more blocks having consecutive address locations, THN having a value of 2 or greater; and upon determining that a matching THN sequence is found, deduplicating the blocks of the THN series using the matching THN sequence.

9. The storage system of claim 8, wherein:

an address location comprises a logical block number (LBN); and a THN sequence comprises a set of THN or more stored blocks having consecutive LBNs.

10. The storage system of claim 8, wherein a THN series matches a THN sequence when the blocks of the THN series have the same data content as or have a high probability of having the same content as the blocks of the THN sequence.

11. The storage system of claim 8, further comprising:

comparison mechanism for storing metadata entries for a plurality of THN sequences, each metadata entry comprising metadata for a THN sequence and being indexed in the comparison mechanism by a content identifier that represents the data contents of the blocks of the THN sequence, wherein the deduplication layer is configured for determining whether a THN series matches a THN sequence using the comparison mechanism.

12. The storage system of claim 8, further comprising:

a mapping mechanism for storing mappings of deduplicated blocks of the THN series to blocks of the matching THN sequence, wherein the deduplication layer is configured for deduplicating the blocks of the THN series by creating indexes to the blocks of the matching THN sequence in the mapping mechanism.

13. A method for deduplicating blocks of data based on a predetermined threshold number (THN) of sequential blocks, the method comprising:

storing a plurality of blocks to a set of one or more disk devices, each disk device comprising a set of tracks for storing blocks; and performing deduplication processing on received blocks by:

receiving a set of blocks;

determining whether the set of received blocks comprises THN or more blocks;

upon determining that the set of received blocks does not comprise THN or more blocks, stopping deduplication processing on the set of received blocks;

upon determining that the set of received blocks comprises THN or more blocks, determining whether a series of THN or more received blocks (THN series) matches, in data content, a sequence of THN or more blocks stored on a disk device (THN sequence), a THN sequence comprising THN or more consecutive blocks stored on a same track of a disk device, THN having a value of 2 or greater; and upon determining that a matching THN sequence is found, deduplicating the blocks of the THN series using the matching THN sequence.

14. The method of claim 13, wherein determining whether a THN series matches a THN sequence comprises:

determining a series content identifier for the THN series by determining a first content identifier for a first block in the THN series and a second content identifier for a second block in the THN series, the first content identifier representing the data contents of the first block in the THN series and the second content identifier representing the data contents of the second block in the THN series, the series content identifier being based on the first and second content identifiers;

determining a sequence content identifier for the THN sequence by determining a third content identifier for a first block in the THN sequence and a fourth content identifier for a second block in the THN sequence, the third content identifier representing the data contents of the first block in the THN sequence and the fourth content identifier representing the data contents of the second block in the THN sequence, the sequence content identifier being based on the third and fourth content identifiers; and determining whether the series content identifier matches the sequence content identifier.

15. The method of claim 14, wherein:

the series content identifier is based on a concatenation of the first and second content identifiers; and the sequence content identifier is based on a concatenation of the third and fourth content identifiers.

16. A method for deduplicating blocks of data for storage based on a predetermined threshold number (THN) of blocks, the method comprising:

storing a plurality of blocks to a set of one or more disk devices, each block having an address location; and performing deduplication processing on received blocks by:

receiving a set of blocks;

determining whether the set of received blocks comprises THN or more blocks;

upon determining that the set of received blocks does not comprise THN or more blocks, stopping deduplication processing on the set of received blocks;

upon determining that the set of received blocks comprises THN or more blocks, determining whether a series of THN or more received blocks (THN series) matches, in data content, a sequence of THN or more blocks stored on a disk device (THN sequence), a THN sequence comprising THN or more blocks having consecutive address locations, THN having a value of 2 or greater; and upon determining that a matching THN sequence is found, deduplicating the blocks of the THN series using the matching THN sequence.

17. The method of claim 16, wherein determining whether a THN series matches a THN sequence comprises:

determining a series content identifier for the THN series by determining a first content identifier for a first block in the THN series and a second content identifier for a second block in the THN series, the first content identifier representing the data contents of the first block in the THN series and the second content identifier representing the data contents of the second block in the THN series, the series content identifier being based on the first and second content identifiers;

determining a sequence content identifier for the THN sequence by determining a third content identifier for a first block in the THN sequence and a fourth content identifier for a second block in the THN sequence, the third content identifier representing the data contents of the first block in the THN sequence and the fourth content identifier representing the data contents of the second block in the THN sequence, the sequence content identifier being based on the third and fourth content identifiers; and determining whether the series content identifier matches the sequence content identifier.

18. The method of claim 17, wherein:

the series content identifier is based on a concatenation of the first and second content identifiers; and the sequence content identifier is based on a concatenation of the third and fourth content identifiers.

19. The storage system of claim 1, wherein determining whether a THN series matches a THN sequence comprises:

determining a series content identifier for the THN series by determining a first content identifier for a first block in the THN series and a second content identifier for a second block in the THN series, the first content identifier representing the data contents of the first block in the THN series and the second content identifier representing the data contents of the second block in the THN series, the series content identifier being based on the first and second content identifiers;

determining a sequence content identifier for the THN sequence by determining a third content identifier for a first block in the THN sequence and a fourth content identifier for a second block in the THN sequence, the third content identifier representing the data contents of the first block in the THN sequence and the fourth content identifier representing the data contents of the second block in the THN sequence, the sequence content identifier being based on the third and fourth content identifiers; and determining whether the series content identifier matches the sequence content identifier.

20. The storage system of claim 19, wherein:

the series content identifier is based on a concatenation of the first and second content identifiers; and the sequence content identifier is based on a concatenation of the third and fourth content identifiers.

21. The storage system of claim 8, wherein determining whether a THN series matches a THN sequence comprises:

determining a series content identifier for the THN series by determining a first content identifier for a first block in the THN series and a second content identifier for a second block in the THN series, the first content identifier representing the data contents of the first block in the THN series and the second content identifier representing the data contents of the second block in the THN series, the series content identifier being based on the first and second content identifiers;

determining a sequence content identifier for the THN sequence by determining a third content identifier for a first block in the THN sequence and a fourth content identifier for a second block in the THN sequence, the third content identifier representing the data contents of the first block in the THN sequence and the fourth content identifier representing the data contents of the second block in the THN sequence, the sequence content identifier being based on the third and fourth content identifiers; and determining whether the series content identifier matches the sequence content identifier.

22. The storage system of claim 21, wherein:

the series content identifier is based on a concatenation of the first and second content identifiers; and the sequence content identifier is based on a concatenation of the third and fourth content identifiers.

23. The storage system of claim 1, wherein the deduplication layer is further configured for:

deriving at least two different THN series from the set of received blocks, each derived THN series comprising a different combination of received blocks; and performing deduplication processing separately on each derived THN series.

24. The storage system of claim 23, wherein the deduplication layer is further configured for:

first performing deduplication processing on the derived THN series having the greatest number of blocks.

25. The storage system of claim 8, wherein the deduplication layer is further configured for:

deriving at least two different THN series from the set of received blocks, each derived THN series comprising a different combination of received blocks; and performing deduplication processing separately on each derived THN series.

26. The storage system of claim 25, wherein the deduplication layer is further configured for:

first performing deduplication processing on the derived THN series having the greatest number of blocks.

27. The method of claim 13, further comprising:

deriving at least two different THN series from the set of received blocks, each derived THN series comprising a different combination of received blocks; and performing deduplication processing separately on each derived THN series.

28. The method of claim 27, further comprising:

first performing deduplication processing on the derived THN series having the greatest number of blocks.

29. The method of claim 16, further comprising:

deriving at least two different THN series from the set of received blocks, each derived THN series comprising a different combination of received blocks; and performing deduplication processing separately on each derived THN series.

30. The method of claim 29, further comprising:

first performing deduplication processing on the derived THN series having the greatest number of blocks.

* * * * *